US012165599B2

(12) United States Patent
Park et al.

(10) Patent No.: US 12,165,599 B2
(45) Date of Patent: Dec. 10, 2024

(54) DISPLAY APPARATUS AND METHOD OF DRIVING DISPLAY PANEL USING THE SAME

(71) Applicant: Samsung Display Co., Ltd., Yongin-Si (KR)

(72) Inventors: Sehyuk Park, Seongnam-si (KR); Hongsoo Kim, Hwaseong-si (KR); Jinyoung Roh, Hwaseong-si (KR); Bonghyun You, Seoul (KR); Hyojin Lee, Seongnam-si (KR); Jaekeun Lim, Suwon-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 18/407,362

(22) Filed: Jan. 8, 2024

(65) Prior Publication Data

US 2024/0185797 A1 Jun. 6, 2024

Related U.S. Application Data

(63) Continuation of application No. 17/717,997, filed on Apr. 11, 2022, now Pat. No. 11,869,439, which is a (Continued)

(30) Foreign Application Priority Data

Mar. 24, 2020 (KR) ........................ 10-2020-0035557

(51) Int. Cl.
*G09G 3/3266* (2016.01)
*G09G 3/3275* (2016.01)

(52) U.S. Cl.
CPC ......... *G09G 3/3266* (2013.01); *G09G 3/3275* (2013.01); *G09G 2310/04* (2013.01); (Continued)

(58) Field of Classification Search
CPC .................................................... G09G 3/3266
See application file for complete search history.

(56) References Cited

U.S. PATENT DOCUMENTS 11,100,863 B2 8/2021 Park et al.
11,869,439 B2 * 1/2024 Park ..................... G09G 3/3266
(Continued)

FOREIGN PATENT DOCUMENTS

KR 10-2020-0034086 A 3/2020
KR 10-2020-0086783 A 7/2020

*Primary Examiner* — Chun-Nan Lin
(74) *Attorney, Agent, or Firm* — Innovation Counsel LLP

(57) ABSTRACT

A display apparatus includes a display panel, a gate driver, a data driver, a driving controller and a power voltage generator. The display panel displays an image based on input image data. The gate driver outputs a gate signal to a gate line. The data driver outputs a data voltage to a data line. The driving controller drives display areas of the display panel in different driving frequencies. The power voltage generator outputs a data power voltage to the data driver. The driving controller outputs an output data enable signal including a writing period having an active signal and a holding period having an inactive signal for the respective display areas. The power voltage generator generates the data power voltage having a high power voltage level during the writing period and a low power voltage level in at least a portion of the holding period.

13 Claims, 14 Drawing Sheets

Related U.S. Application Data continuation of application No. 17/143,191, filed on Jan. 7, 2021, now Pat. No. 11,302,259.

(52) U.S. Cl.
CPC ............... *G09G 2320/0247* (2013.01); *G09G 2320/103* (2013.01); *G09G 2330/023* (2013.01); *G09G 2330/028* (2013.01)

(56) References Cited

U.S. PATENT DOCUMENTS

| | | | | |
|---|---|---|---|---|
| 2006/0007194 | A1* | 1/2006 | Verschueren | G09G 3/3611 345/204 |
| 2008/0024480 | A1 | 1/2008 | Jee et al. | |
| 2008/0284719 | A1 | 11/2008 | Yoshida | |
| 2010/0134473 | A1* | 6/2010 | Matsuda | G09G 3/3677 345/94 |
| 2012/0162159 | A1* | 6/2012 | Kim | G09G 3/3233 345/82 |
| 2013/0002641 | A1 | 1/2013 | Kim et al. | |
| 2014/0085276 | A1* | 3/2014 | Jang | G09G 3/2007 345/204 |
| 2014/0320479 | A1* | 10/2014 | Kaneko | G02F 1/13306 345/212 |
| 2014/0333673 | A1* | 11/2014 | Cho | G09G 3/3406 345/660 |
| 2014/0375627 | A1* | 12/2014 | Kim | G09G 3/3677 345/90 |
| 2015/0049126 | A1* | 2/2015 | Jung | G09G 3/3233 315/172 |
| 2015/0116300 | A1 | 4/2015 | Yamaki et al. | |
| 2015/0138254 | A1 | 5/2015 | Nakayama et al. | |
| 2015/0145900 | A1 | 5/2015 | Lee et al. | |
| 2015/0170607 | A1 | 6/2015 | Shin | |
| 2015/0187334 | A1* | 7/2015 | Oh | G09G 3/3614 345/204 |
| 2015/0269892 | A1 | 9/2015 | Yang et al. | |
| 2016/0111055 | A1* | 4/2016 | Na | G09G 3/3666 345/94 |
| 2016/0189616 | A1* | 6/2016 | Oh | G09G 3/3648 345/96 |
| 2017/0323610 | A1* | 11/2017 | Lin | G09G 3/3648 |
| 2018/0024386 | A1 | 1/2018 | Kim et al. | |
| 2018/0048853 | A1* | 2/2018 | Koh | G09G 3/3688 |
| 2018/0061915 | A1* | 3/2018 | Yu | H10K 59/1213 |
| 2018/0322843 | A1 | 11/2018 | Takahashi et al. | |
| 2019/0172427 | A1 | 6/2019 | Saini et al. | |
| 2021/0375193 | A1 | 12/2021 | Son et al. | |

* cited by examiner

FIG. 9

| STAGE | GRAYSCALE VALUE (8 BITS) | FLICKER VALUE | DRIVING FREQUENCY(Hz) |
|---|---|---|---|
| 1 | 0-3 | 0 | 1 |
| 2 | 4-7 | 0 | 1 |
| 3 | 8-11 | 40 | 2 |
| 4 | 12-15 | 80 | 5 |
| 5 | 16-19 | 120 | 10 |
| 6 | 20-23 | 160 | 30 |
| 7 | 24-27 | 200 | 60 |
| ⋮ | ⋮ | ⋮ | ⋮ |
| 60 | 236-239 | 0 | 1 |
| 61 | 240-243 | 0 | 1 |
| 62 | 244-247 | 0 | 1 |
| 63 | 248-251 | 0 | 1 |
| 64 | 252-255 | 0 | 1 |

DISPLAY APPARATUS AND METHOD OF DRIVING DISPLAY PANEL USING THE SAME

PRIORITY STATEMENT

This application is a continuation application of U.S. patent application Ser. No. 17/717,997 filed on Apr. 11, 2022, which is a continuation application of U.S. patent application Ser. No. 17/143,191 filed on Jan. 7, 2021, now U.S. Pat. No. 11,302,259, which claims priority under 35 U.S.C. § 119 to Korean Patent Application No. 10-2020-0035557, filed on Mar. 24, 2020, in the Korean Intellectual Property Office KIPO, the contents of which are herein incorporated by reference in their entireties.

BACKGROUND

1. Field

Example embodiments of the present inventive concept relate to a display apparatus and a method of driving a display panel using the display apparatus. More particularly, example embodiments of the present inventive concept relate to a display apparatus reducing power consumption and a method of driving a display panel using the display apparatus.

2. Description of the Related Art

A method to minimize power consumption of an IT product such as a tablet PC and a note PC has been studied.

To minimize the power consumption of the IT product which includes a display panel, power consumption of the display panel should be minimized. When the display panel displays a static image, the display panel may be driven in a relatively low frequency so that power consumption of the display panel may be reduced.

When a portion of the display panel displays a moving image and another portion of the display panel displays a static image, the display panel may be driven by a relatively high frequency so that the power consumption of the display panel may not be effectively reduced.

In addition, when a moving image is displayed only on a portion of the display panel and an analog power voltage maintains a high level, the effect of reducing power consumption may not be significant.

SUMMARY

Example embodiments of the present inventive concept provide a display apparatus capable of reducing a power consumption and enhancing a display quality.

Example embodiments of the present inventive concept also provide a method of driving a display panel using the display apparatus.

In an example embodiment of a display apparatus according to the present inventive concept, the display apparatus includes a display panel, a gate driver, a data driver and a driving controller and a power voltage generator. The display panel includes a gate line, a data line and a pixel and is configure to display an image based on input image data. The gate driver is configured to output a gate signal to the gate line. The data driver is configured to output a data voltage to the data line. The driving controller is configured to drive display areas of the display panel in different driving frequencies. The power voltage generator is configured to output a data power voltage to the data driver. The driving controller is configured to output an output data enable signal including a writing period having an active signal and a holding period having an inactive signal for the display areas, respectively. The power voltage generator is configured to generate the data power voltage having a high power voltage level during the writing period and a low power voltage level in at least a portion of the holding period.

In an example embodiment, the driving controller may include a static image determiner configured to determine whether each of the display areas represents a static image or a moving image.

In an example embodiment, the driving controller may further include a driving frequency determiner configured to determine driving frequencies of the display areas based on flicker values according to grayscale values of the input image data corresponding to the display areas.

In an example embodiment, the driving controller may be configured to determine whether each of the display areas is in the writing period or the holding period in a frame based on the driving frequencies of the display areas. The driving controller may be configured to generate a multi frequency signal having an active level during the writing period and an inactive level during the holding period.

In an example embodiment, the driving controller may be configured to generate a power control signal having a first level during the writing period and a second level in at least a portion of the holding period.

In an example embodiment, when a first group of the display areas has the writing period and a second group of the display areas has the holding period in the frame, the multi frequency signal has the active level when the power control signal has the first level and the multi frequency signal has the inactive level when the power control signal has the second level.

In an example embodiment, when the display area is in the holding period, a period when the power control signal has the second level may be shorter than a period when the multi frequency signal has the inactive level.

In an example embodiment, when the display area is in the holding period, a time point when the power control signal is changed from the first level to the second level may be later than a time point when the multi frequency signal is changed from the active level to the inactive level. When the display area is in the holding period, a time point when the power control signal is changed from the second level to the first level may be same as a time point when the multi frequency signal is changed from the inactive level to the active level in the holding frame.

In an example embodiment, when the display area is in the holding period, a time point when the power control signal is changed from the first level to the second level may be later than a time point when the multi frequency signal is changed from the active level to the inactive level in the holding frame. When the display area has the holding period, a time point when the power control signal is changed from the second level to the first level may be earlier than a time point when the multi frequency signal is changed from the inactive level to the active level in the holding frame.

In an example embodiment, the driving controller may further include a fixed frequency determiner configured to determine whether an input frequency of the input image data has a normal type by counting a number of pulses of a vertical synchronizing signal in one second.

In an example embodiment, the driving controller may further include a compensation frame inserter configured to insert a compensation frame between a frame of a first frequency and a frame of a second frequency when the driving frequency of the display area is changed from the first frequency to the second frequency by the driving frequency determiner.

In an example embodiment, a number of the display areas may be equal to or greater than three. The display areas may be driven in different frequencies from one another.

In an example embodiment, sizes of the display areas may be different from one another.

In an example embodiment, the driving controller may be configured to determine the sizes of the display areas based on a boundary between a static image display area representing a static image and a moving image display area representing a moving image and a flicker value for the grayscale values of the input image data.

In an example embodiment, when a size of the display area is equal to or greater than a threshold value and the display area has the holding period, the data power voltage may have the low power voltage level in at least a portion of the holding period. When the size of the display area is less than the threshold value and the display area has the holding period, the data power voltage may have the high power voltage level during the holding period.

In an example embodiment, when the size of the display area is equal to or greater than a threshold value and the display area has the holding period, the data power voltage may have a first low power voltage level in at least a portion of the holding period. When the size of the display area is less than the threshold value and the display area has the holding period, the data power voltage may have a second low power voltage level greater than the first low power voltage level and less than the high power voltage level during the holding period.

In an example embodiment, when a size of a present display area is equal to or greater than a threshold value and the present display area has the holding period, the data power voltage may have the low power voltage level in at least a portion of the holding period of the present display area. When the size of the display area is less than the threshold value, the present display area has the holding period and the data power voltage has the low power voltage level for a previous display area, the data power voltage may have the low power voltage level in at least a portion of the holding period of the present display area. When the size of the display area is less than the threshold value, the present display area has the holding period and the data power voltage does not have the low power voltage level for the previous display area, the data power voltage may have the high power voltage level during the holding period of the present display area.

In an example embodiment of a method of driving a display panel, the method includes independently determining driving frequencies of display areas, generating an output data enable signal including a writing period having an active signal and a holding period having an inactive signal for the display areas, respectively, generating a data power voltage having a high power voltage level during the writing period and a low power voltage level in at least a portion of the holding period, outputting a gate signal to a gate line of the display panel and outputting a data voltage to a data line of the display panel using input image data, the output data enable signal and the data power voltage.

In an example embodiment, the method may further include determining whether each of the display areas represents a static image or a moving image.

In an example embodiment, the driving frequencies of the display areas may be determined based on flicker values according to grayscale values of the input image data corresponding to the display areas.

According to the method of driving the display panel and the display apparatus for performing the display panel, the driving frequency is determined according to an image displayed on the display panel so that a power consumption of the display apparatus may be reduced. In addition, when the input image data include a static image display area and a moving image display area, the static image display area and the moving image display area may be driven in different frequencies so that the power consumption of the display apparatus may be further reduced.

In addition, when the display area is in a holding period corresponding to a low frequency driving mode, the level of the data power voltage outputted to the data driver may be decreased so that the power consumption of the display apparatus may be reduced.

BRIEF DESCRIPTION OF THE DRAWINGS

The above and other features and advantages of the present inventive concept will become more apparent by describing in detailed example embodiments thereof with reference to the accompanying drawings, in which:

FIG. 9 is a table illustrating an example of a flicker value storage of FIG. 2;

DETAILED DESCRIPTION OF THE INVENTIVE CONCEPT

Hereinafter, the present inventive concept will be explained in detail with reference to the accompanying drawings.

Figure 1:
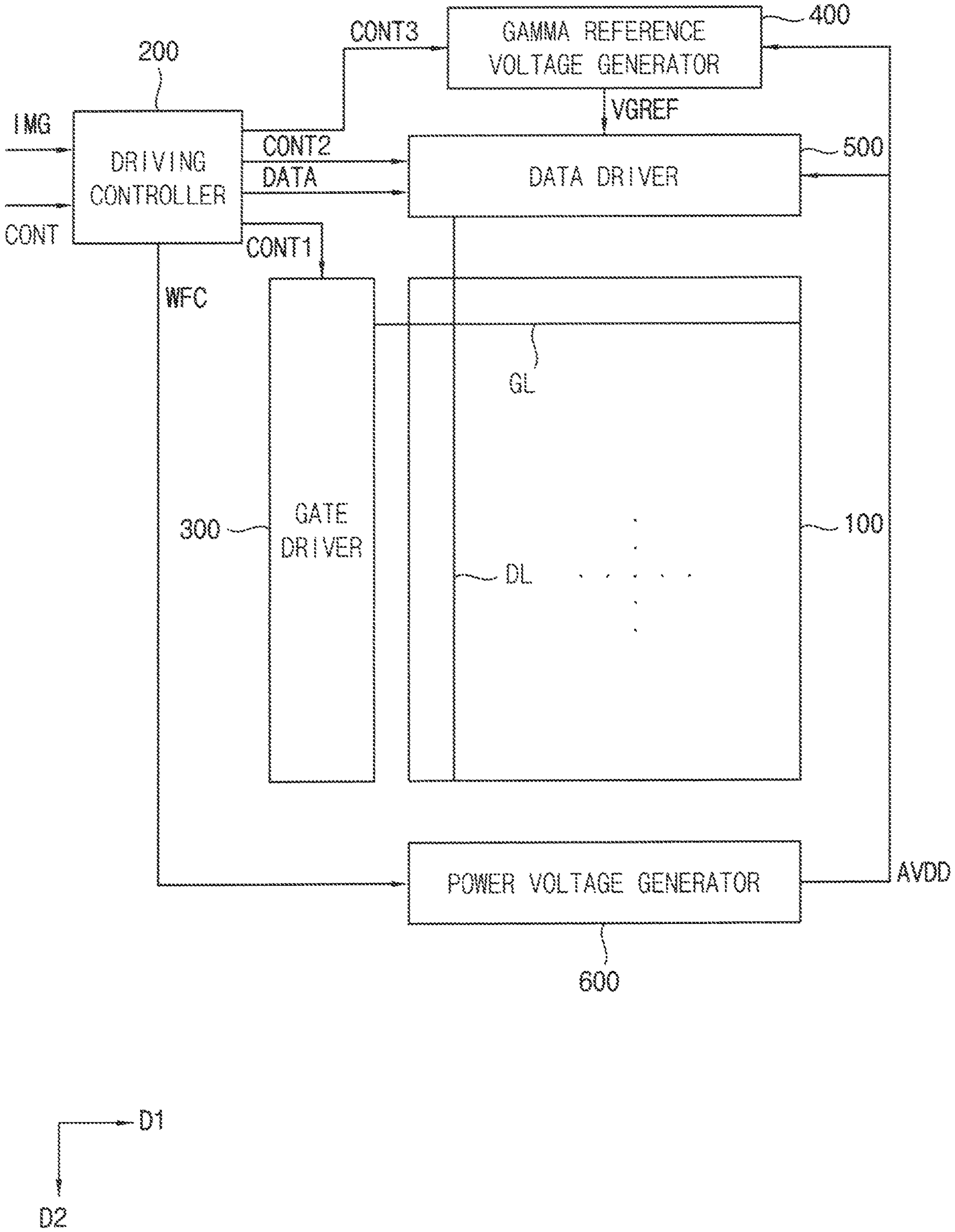
FIG. 1 is a block diagram illustrating a display apparatus according to an example embodiment of the present inventive concept.

FIG. 1 is a block diagram illustrating a display apparatus according to an example embodiment of the present inventive concept.

Referring to FIG. 1, the display apparatus includes a display panel 100 and a display panel driver. The display panel driver includes a driving controller 200, a gate driver 300, a gamma reference voltage generator 400 and a data driver 500. The display panel driver may further include a power voltage generator 600.

The driving controller 200 and the data driver 500 may be integrally formed in one integrated circuit chip. The driving controller 200, the gamma reference voltage generator 400 and the data driver 500 may be integrally formed in one integrated circuit chip. The driving controller 200, the gamma reference voltage generator 400, the data driver 500 and the power voltage generator 600 may be integrally formed in one integrated circuit chip. A driving module including at least the driving controller 200 and the data driver 500 which are integrally formed in one integrated circuit chip may be called to a timing controller embedded data driver (TED).

The display panel 100 includes a plurality of gate lines GL, a plurality of data lines DL and a plurality of pixels connected to the gate lines GL and the data lines DL, respectively. The gate lines GL extend in a first direction D1 and the data lines DL extend in a second direction D2 crossing the first direction D1.

For example, the display panel 100 may be an organic light emitting display panel including an organic light emitting element.

The display panel 100 may be driven in a normal driving mode in which the display panel 100 is driven in a normal driving frequency and in a low frequency driving mode in which the display panel 100 is driven in a frequency less than the normal driving frequency.

For example, when the input image data represent a moving image, the display panel 100 may be driven in the normal driving mode. For example, when the input image data represent a static image, the display panel may be driven in the low frequency driving mode. For example, when the display apparatus is operated in the always on mode, the display panel may be driven in the low frequency driving mode.

In addition, in the present example embodiment, a portion of the input image data representing a moving image may be driven in the normal driving mode and another portion of the input image data representing a static image may be driven in the low frequency driving mode.

The display panel 100 may be driven in a unit of frame. The display panel 100 may be refreshed in every frame in the normal driving mode. Thus, the normal driving mode includes only writing frames in which the data is written in the pixels.

The display panel 100 may be refreshed in a frequency lower than the refresh frequency of the normal driving mode in the low frequency driving mode. Thus, one frame in the low frequency driving mode includes the writing frames in which the data is written in the pixels and holding frames in which the written data is maintained without writing the data in the pixels.

In the present example embodiment, a display panel 100 may include a first portion having a writing period and a second portion having a holding period in a single frame.

The driving controller 200 receives input image data IMG and an input control signal CONT from an external apparatus, for example, a graphic controller of the IT product. The input image data IMG may include red image data, green image data and blue image data. The input image data IMG may further include white image data. The input image data IMG may include magenta image data, yellow image data and cyan image data. The input control signal CONT may include a master clock signal and a data enable signal (an input data enable signal). The input control signal CONT may further include a vertical synchronizing signal and a horizontal synchronizing signal.

The driving controller 200 generates a first control signal CONT1, a second control signal CONT2, a third control signal CONT3 and a data signal DATA based on the input image data IMG and the input control signal CONT.

The driving controller 200 generates the first control signal CONT1 for controlling an operation of the gate driver 300 based on the input control signal CONT, and outputs the first control signal CONT1 to the gate driver 300. The first control signal CONT1 may include a vertical start signal and a gate clock signal.

The driving controller 200 generates the second control signal CONT2 for controlling an operation of the data driver 500 based on the input control signal CONT, and outputs the second control signal CONT2 to the data driver 500. The second control signal CONT2 may include a horizontal start signal and a load signal.

The driving controller 200 generates the data signal DATA based on the input image data IMG. The driving controller 200 outputs the data signal DATA to the data driver 500.

For example, the driving controller 200 may adjust a driving frequency of the display panel 100 based on the input image data IMG.

The driving controller 200 generates the third control signal CONT3 for controlling an operation of the gamma reference voltage generator 400 based on the input control signal CONT, and outputs the third control signal CONT3 to the gamma reference voltage generator 400.

A structure and an operation of the driving controller 200 are explained referring to FIGS. 2 to 9 in detail.

The gate driver 300 generates gate signals driving the gate lines GL in response to the first control signal CONT1 received from the driving controller 200. The gate driver 300 outputs the gate signals to the gate lines GL. For example, the gate driver 300 may sequentially output the gate signals to the gate lines GL. The gate driver 300 may be mounted on the display panel 100. The gate driver 300 may be integrated on the display panel 100.

The gamma reference voltage generator 400 generates a gamma reference voltage VGREF in response to the third control signal CONT3 received from the driving controller 200. The gamma reference voltage generator 400 provides the gamma reference voltage VGREF to the data driver 500. The gamma reference voltage VGREF has a value corresponding to a level of the data signal DATA.

In an example embodiment, the gamma reference voltage generator 400 may be embedded in the driving controller 200, or in the data driver 500.

The data driver 500 receives the second control signal CONT2 and the data signal DATA from the driving controller 200, and receives the gamma reference voltages VGREF from the gamma reference voltage generator 400. The data driver 500 converts the data signal DATA into data voltages having an analog type using the gamma reference voltages VGREF. The data driver 500 outputs the data voltages to the data lines DL.

The power voltage generator 600 may generate a data power voltage AVDD for driving the data driver 500 and output the data power voltage AVDD to the data driver 500. The power voltage generator 600 may also output the data power voltage AVDD to the gamma reference voltage generator 400.

Figure 2:
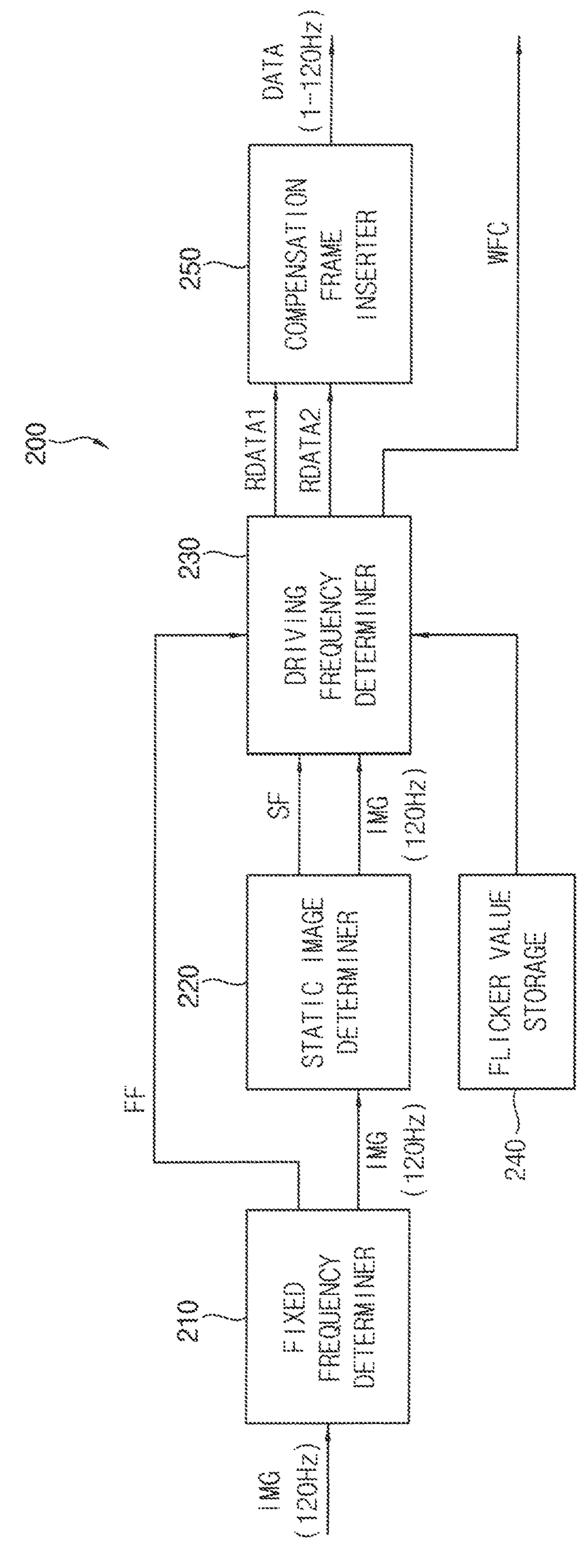
FIG. 2 is a block diagram illustrating a driving controller of FIG. 1.
Figure 3:
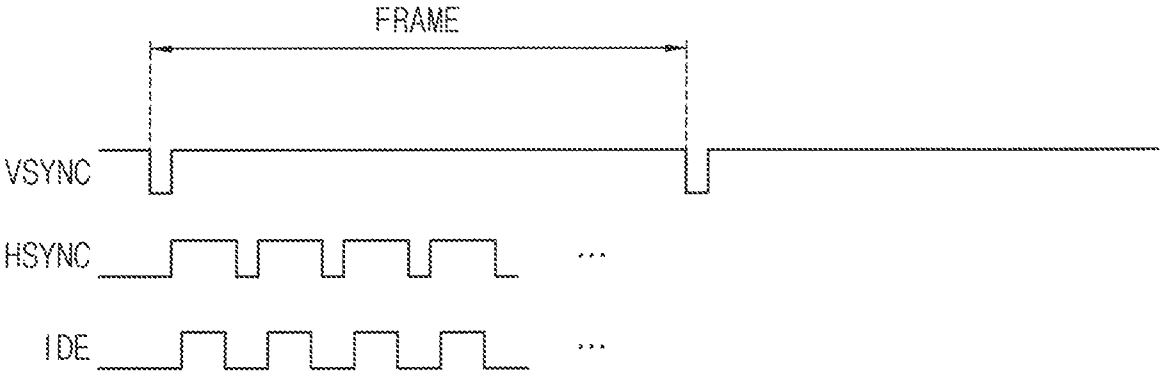
FIG. 3 is a timing diagram illustrating an operation of a fixed frequency determiner of FIG. 2.

FIG. 2 is a block diagram illustrating the driving controller 200 of FIG. 1. FIG. 3 is a timing diagram illustrating an operation of a fixed frequency determiner 210 of FIG. 2.

Referring to FIGS. 1 to 3, the driving controller 200 may include a static image determiner 220, a driving frequency determiner 230 and a flicker value storage 240. The driving controller 200 may further include the fixed frequency determiner 210. The driving controller 200 may further include a compensation frame inserter 250.

The fixed frequency determiner 210 may determine whether or not the input image data IMG has a normal input frequency. For example, the fixed frequency determiner 210 may determine whether or not the input frequency of the input image data IMG has the normal input frequency by counting the number of pulses of a horizontal synchronizing signal HSYNC between a first pulse and a second pulse of a vertical synchronizing signal VSYNC or by counting the number of pulses of an input data enable signal IDE between the first pulse and the second pulse of the vertical synchronizing signal VSYNC.

A time duration between the first pulse and the second pulse of the vertical synchronizing signal VSYNC may be defined as one frame. When the input frequency of the input image data IMG is 120 Hz, the number of the pulses of the vertical synchronizing signal VSYNC during one second may be 120.

When the number of the vertical synchronizing signal VSYNC in one second is equal to the input frequency, the fixed frequency determiner 210 may determine that the input frequency of the input image data IMG has the normal type. In contrast, when the number of the vertical synchronizing signal VSYNC in one second is not equal to the input frequency, the fixed frequency determiner 210 may determine that the input frequency of the input image data IMG does not have the normal type.

The fixed frequency determiner 210 may generate a frequency flag FF representing whether the input frequency of the input image data IMG has the normal type or not. The fixed frequency determiner 210 may output the frequency flag FF to the driving frequency determiner 230. The driving frequency determiner 230 may determine the driving frequency of the display panel 100 in response to the frequency flag FF. For example, when the input frequency of the input image data IMG does not have the normal type. For example, when the input frequency of the input image data IMG has a low driving frequency, the driving frequency determiner 230 may drive the switching elements in the pixel not in the low driving frequency but in the normal driving frequency (e.g., 120 Hz). When the input frequency of the input image data IMG has the low driving frequency and the display panel 100 is driven in the low driving frequency, images displayed on the display panel 100 may have a display defect, for example, flicker. In addition, the static image determiner 220 may not operate when the input frequency of the input image data IMG does not have the normal type, because the driving frequency is fixed to the normal driving frequency when the input frequency of the input image data IMG does not have the normal type.

Figure 4:
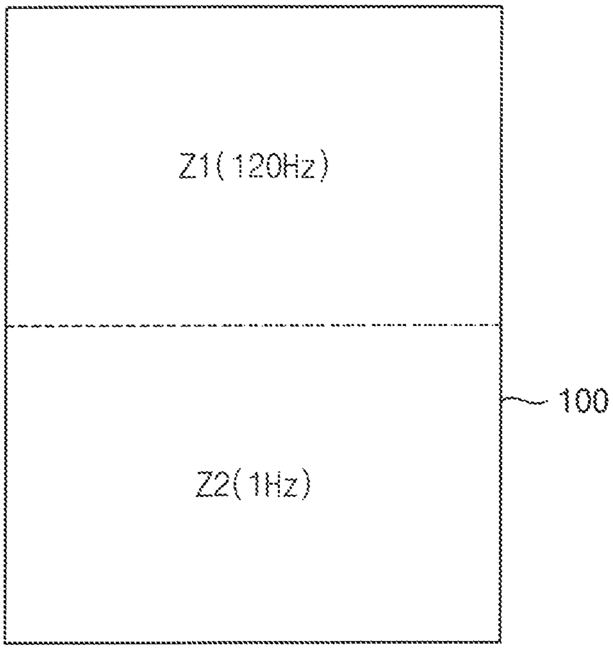
FIG. 4 is a conceptual diagram illustrating the display panel of FIG. 1 which includes a first area driven in a frequency of 120 Hz and a second area driven in a frequency of 1 Hz.
Figure 5:
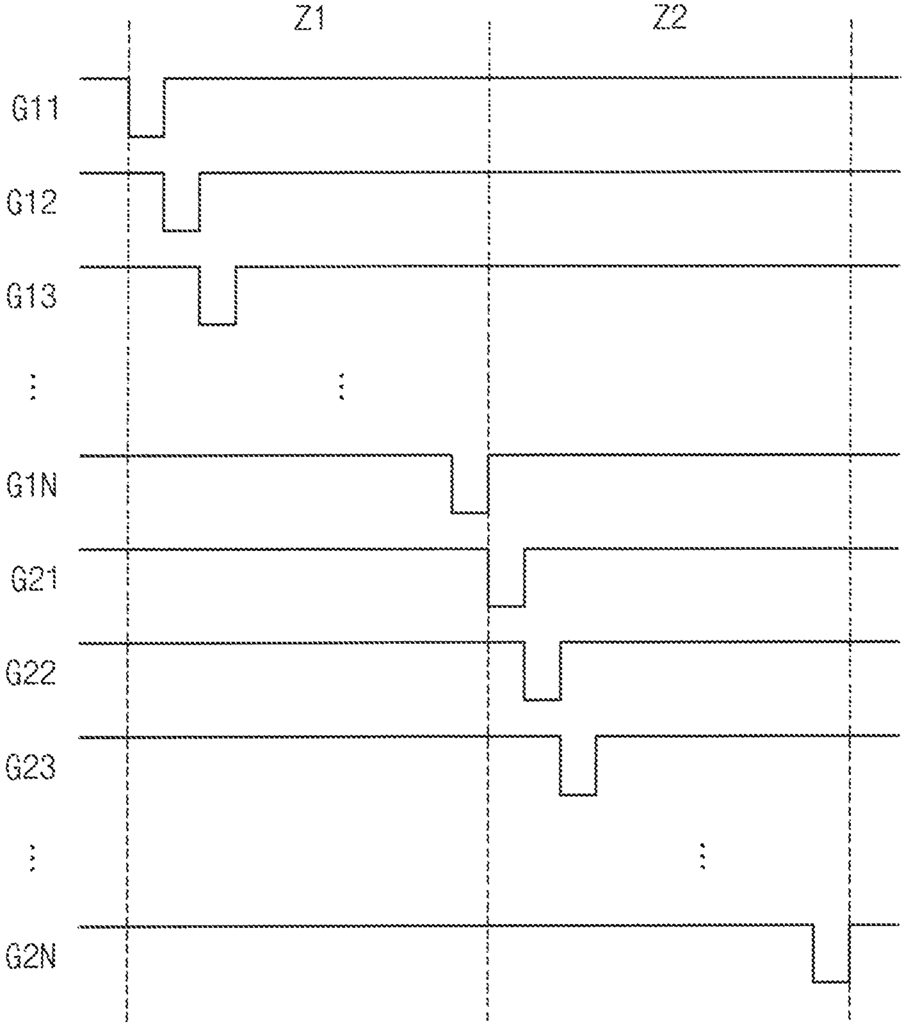
FIG. 5 is a timing diagram illustrating a gate signal outputted from a gate driver during a first frame in a case of FIG. 4.
Figure 6:
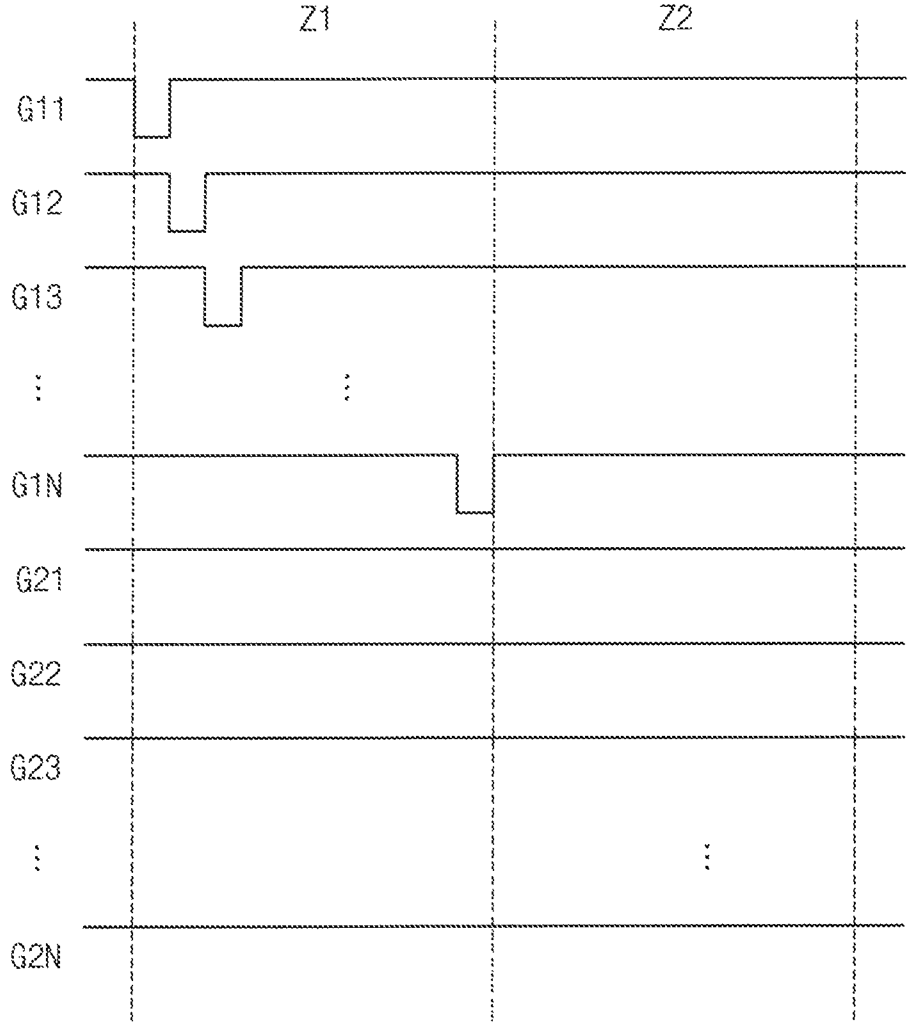
FIG. 6 is a timing diagram illustrating a gate signal outputted from the gate driver during a second frame in the case of FIG. 4.
Figure 7:
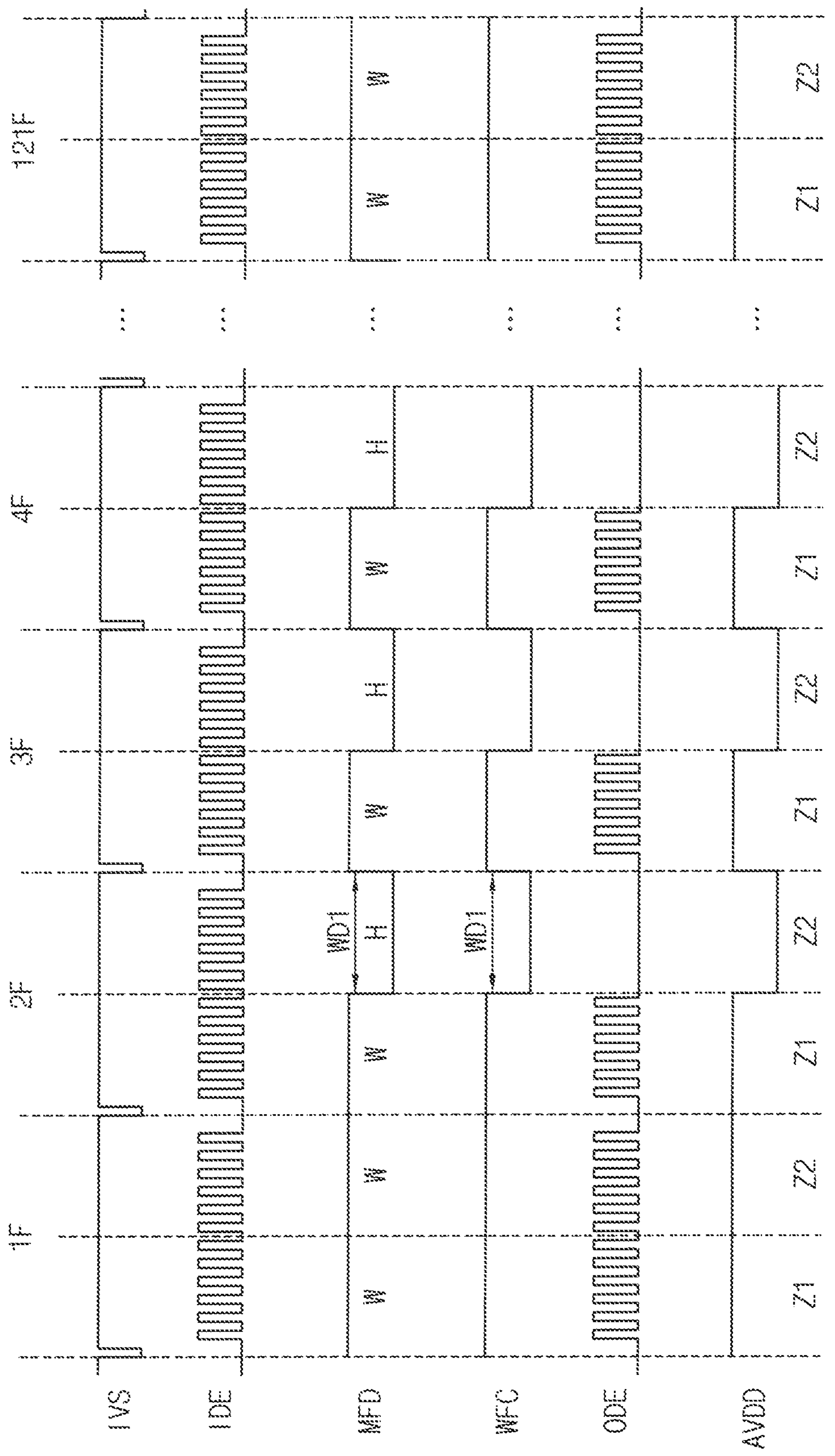
FIG. 7 is a timing diagram illustrating an input signal, a generated signal and an output signal of the driving controller of FIG. 1 and an output signal of a power voltage generator of FIG. 1.

FIG. 4 is a conceptual diagram illustrating the display panel 100 of FIG. 1 which includes a first area Z1 driven in a frequency of 120 Hz and a second area Z2 driven in a frequency of 1 Hz. FIG. 5 is a timing diagram illustrating a gate signal outputted from the gate driver 300 during a first frame in a case of FIG. 4. FIG. 6 is a timing diagram illustrating a gate signal outputted from the gate driver 300 during a second frame in the case of FIG. 4. FIG. 7 is a timing diagram illustrating an input signal, a generated signal and an output signal of the driving controller 200 of FIG. 1 and an output signal of a power voltage generator 600 of FIG. 1.

Referring to FIGS. 1 to 7, the display panel 100 may include a plurality of display areas. In the present example embodiment, the display panel 100 may include a first display area Z1 and a second display area Z2.

The driving controller 200 may drive the display areas Z1 and Z2 of the display panel 100 in different driving frequencies RDATA1 and RDATA2. The driving controller 200 may independently determine the driving frequencies RDATA1 and RDATA2 of the display areas Z1 and Z2 of the display panel 100.

When the input image data IMG corresponding to the first display area Z1 represent a static image, the driving controller 200 may determine a first driving frequency of the first display area Z1 based on a flicker value according to grayscale values of the input image data IMG and generate a data signal of the first driving frequency corresponding to the first display area Z1.

When the input image data IMG corresponding to the second display area Z2 represent a static image, the driving controller 200 may determine a second driving frequency of the second display area Z2 based on a flicker value according to grayscale values of the input image data IMG and generate a data signal of the second driving frequency corresponding to the second display area Z2.

The static image determiner 220 may respectively determine whether the display areas Z1 and Z2 represent a static image or a moving image. The static image determiner 220 may output a flag signal SF representing whether the display areas Z1 and Z2 represent a static image or a moving image. The static image determiner 220 may output the flag signal SF to the driving frequency determiner 230. For example, when the display areas Z1 and Z2 represent a static image, the static image determiner 220 may output the flag signal SF of 1 to the driving frequency determiner 230. When the display areas Z1 and Z2 represent a moving image, the static image determiner 220 may output the flag signal SF of 0 to the driving frequency determiner 230. When the display panel 100 is operated in always on mode which allows the user to customize a display screen to show time, date, battery status, notifications, screen savers and more, the static image determiner 220 may output the flag signal SF of 1 to the driving frequency determiner 230.

For example, the driving frequency determiner 230 may drive switching elements of the pixel of the display area having the flag signal SF of 1 in the low driving frequency. The driving frequency determiner 230 may drive the switching elements of the pixel of the display area having the flag signal SF of 0 in the normal driving frequency.

The driving frequency determiner 230 may determine driving frequencies of the display areas Z1 and Z2 based on the flicker value according to grayscale values of the input image data IMG corresponding to the display areas Z1 and Z2.

The driving frequency determiner 230 may refer the flicker value storage 240 to determine the frequency to be used for the low driving frequency. The flicker value storage 240 may include the flicker value representing a degree of a flicker according to the grayscale value of the input image data IMG.

The flicker value storage 240 may store the grayscale values of the input image data IMG and the flicker values corresponding to the grayscale values. The flicker value corresponding to the grayscale value means a degree of the flicker perceived by the user when an image has the grayscale value. When the flicker value is high, the flicker may not be perceived by the user only when the display panel 100 is driven in a relatively high driving frequency.

Thus, when the flicker value corresponding to the grayscale value is high, the driving frequency determiner 230 may determine the driving frequency of the display panel 100 to be high. In contrast, when the flicker value corresponding to the grayscale value is low, the driving frequency determiner 230 may determine the driving frequency of the display panel 100 to be low.

When the driving frequency of the display area (e.g., Z1 and Z2) is changed from a first frequency to a second frequency which is higher than the first frequency by the driving frequency determiner 230, the compensation frame inserter 250 may insert at least one compensation frame between adjacent frames of the first frequency.

For example, the compensation frame inserter 250 may independently operated for the display areas Z1 and Z2. When the driving frequency of the first display area Z1 is changed from a first frequency to a second frequency which is higher than the first frequency, the compensation frame inserter 250 may insert a compensation frame between the adjacent frames of the first frequency, thereby make the image to have the second frequency which is higher than the first frequency. When the driving frequency of the first display area Z1 is changed from a third frequency to a fourth frequency which is higher than the third frequency, the compensation frame inserter 250 may insert a compensation frame between adjacent frames of the third frequency, thereby make the image to have the fourth frequency which is higher than the third frequency.

The compensation frame inserter 250 may determine a frequency of the compensation frame and the number of the compensation frames. For example, when the driving frequency of the first display area Z1 is changed from the first frequency to the second frequency which is lower than the first frequency, the frequency of the compensation frame may be determined to have a value between the first frequency and the second frequency. For example, when the driving frequency is changed from 60 Hz to 10 Hz, the frequency of the compensation frame may be determined to one of 30 Hz, 20 Hz and 15 Hz. For example, when the first driving frequency is changed from 60 Hz to 1 Hz, the frequency of the compensation frame may be determined to one of 30 Hz, 20 Hz, 15 Hz, 10 Hz, 5 Hz and 2 Hz. The compensation frame inserter 250 may determine a plurality of the frequencies of the compensation frames.

The compensation frame inserter 250 may determine the number of the compensation frames based on difference between the first frequency and the second frequency. For example, when the difference between the first frequency and the second frequency is little, the number of the compensation frames may be little. In contrast, when the difference between the first frequency and the second frequency is great, the number of the compensation frames may be great.

In FIGS. 4 to 7, for example, the driving frequency determiner 230 may determine the driving frequency of the first area Z1 to 120 Hz and the driving frequency of the second area Z2 to 1 Hz.

The gate driver 300 may output a first gate signal group G11 to GIN corresponding to the first area Z1 and a second gate signal group G21 to G2N corresponding to the second area Z2.

The gate driver 300 may inactivate an output of at least one of the first gate signal group G11 to GIN and the second gate signal group G21 to G2N based on the driving frequency of the first area Z1 and the driving frequency of the second area Z2.

For example, when the driving frequency of the first area Z1 is 120 Hz and the driving frequency of the second area Z2 is 1 Hz, the first area Z1 may have one hundred and twenty writing periods in one second and the second area Z2 may have one writing period and one hundred and nineteen holding periods in one second.

When the first area Z1 has the writing period, the first gate signal group G11 to GIN corresponding to the first area Z1 may be activated. When the first area Z1 has the holding period, the first gate signal group G11 to GIN corresponding to the first area Z1 may be inactivated. For example, the first gate signal group G11 to GIN may be inactivated by a masking method.

When the second area Z2 has the writing period, the second gate signal group G21 to G2N corresponding to the second area Z2 may be activated. When the second area Z2 has the holding period, the second gate signal group G21 to G2N corresponding to the second area Z2 may be inactivated. For example, the second gate signal group G21 to G2N may be inactivated by a masking method.

For example, FIG. 5 represents a first frame and the first display area Z1 has the writing period in the first frame and the second display area Z2 has the writing period in the first frame. Thus, the first gate signal group G11 to GIN and the second gate signal group G21 to G2N may be activated in the first frame.

For example, FIG. 6 represents a second frame and the first display area Z1 has the writing period in the second frame but the second display area Z2 has the holding period in the second frame. Thus, the first gate signal group G11 to GIN may be activated in the second frame but the second gate signal group G21 to G2N may be inactivated in the second frame.

As shown in FIG. 7, the driving controller 200 may receive an input vertical start signal IVS and an input data enable signal IDE. The input vertical start signal IVS may has a cycle of the frame. The input data enable signal IDE may has a cycle of a horizontal line period.

The driving frequency determiner 230 may determine the driving frequencies of the display areas Z1 and Z2 and determine whether each of the display areas Z1 and Z2 is in a writing period W or a holding frame H based on the driving frequencies of the display areas Z1 and Z2.

The driving frequency determiner 230 may generate a multi frequency signal MFD representing whether each of the display areas Z1 and Z2 is in the writing period W or the holding frame H based on the driving frequencies of the display areas Z1 and Z2.

The multi frequency signal MFD may have an active level during the writing period W. The multi frequency signal MFD may have an inactive level during the holding period H.

The driving controller 200 may generate an output data enable signal ODE representing an active status of the data signal DATA based on the multi frequency signal MFD.

When the multi frequency signal MFD has the active level, the output data enable signal ODE has an active level. When the multi frequency signal MFD has the inactive level, the output data enable signal ODE has an inactive level.

For example, when the multi frequency signal MFD has the active level, the output data enable signal ODE may have a same pulse as a pulse of the input data enable signal IDE. In contrast, when the multi frequency signal MFD has the inactive level, the output data enable signal ODE may be generated by masking the input data enable signal IDE.

The first display area Z1 is driven in the frequency of 120 Hz so that the multi frequency signal MFD may have the writing periods W corresponding to the first display area Z1 in first to one hundred and twentieth frames. The second display area Z2 is driven in the frequency of 1 Hz so that the multi frequency signal MFD may have the writing period W in a first frame and the holding periods H in second to one hundred and twentieth frames.

When the driving frequencies of the display areas Z1 and Z2 are not changed, the waveforms of the signals in the first to one hundred and twentieth frames of FIG. 7 may be repeated in one hundred and twenty first frames to two hundreds and fortieth frames.

When the second display area Z2 has the holding period H, the pulses of the gate signal corresponding to the second display area Z2 may not be output as explained referring to FIG. 6 and the pulses of the output data enable signal ODE corresponding to the second display area Z2 may not be output as explained referring to FIG. 7.

In the present example embodiment, when the second display area Z2 has the holding period H, a data power voltage AVDD applied to the data driver 500 may be turned off so that a power consumption of the data driver 500 may be reduced.

When the data power voltage AVDD is turned off, a power consumption of the gamma reference voltage generator 400 may be also reduced.

In the present example embodiment, the data power voltage AVDD may have a high power voltage level during the writing period W and have a low power voltage level during the holding period H.

The driving frequency determiner 230 may generate a power control signal WFC controlling the data power voltage AVDD to the high power voltage level or the low power voltage level based on the driving frequency of the display area Z1 and Z2. The power control signal WFC may have a first level for setting the data power voltage AVDD to the high power voltage level and a second level for setting the data power voltage AVDD to the low power voltage level.

In the present example embodiment, when some of the display areas have the writing period W and other of the display areas have the holding period H in the frame, the power control signal WFC may have the first level corresponding to a period when the multi frequency signal MFD has the active level and the power control signal WFC may have the second level corresponding to a period when the multi frequency signal MFD has the inactive level. For example, when some of the display areas have the writing period W and other of the display areas have the holding period H in the frame, a period when the power control signal WFC has the first level may be equal to a period when the multi frequency signal MFD has the active level and a period when the power control signal WFC has the second level may be equal to a period when the multi frequency signal MFD has the inactive level.

Figure 8:
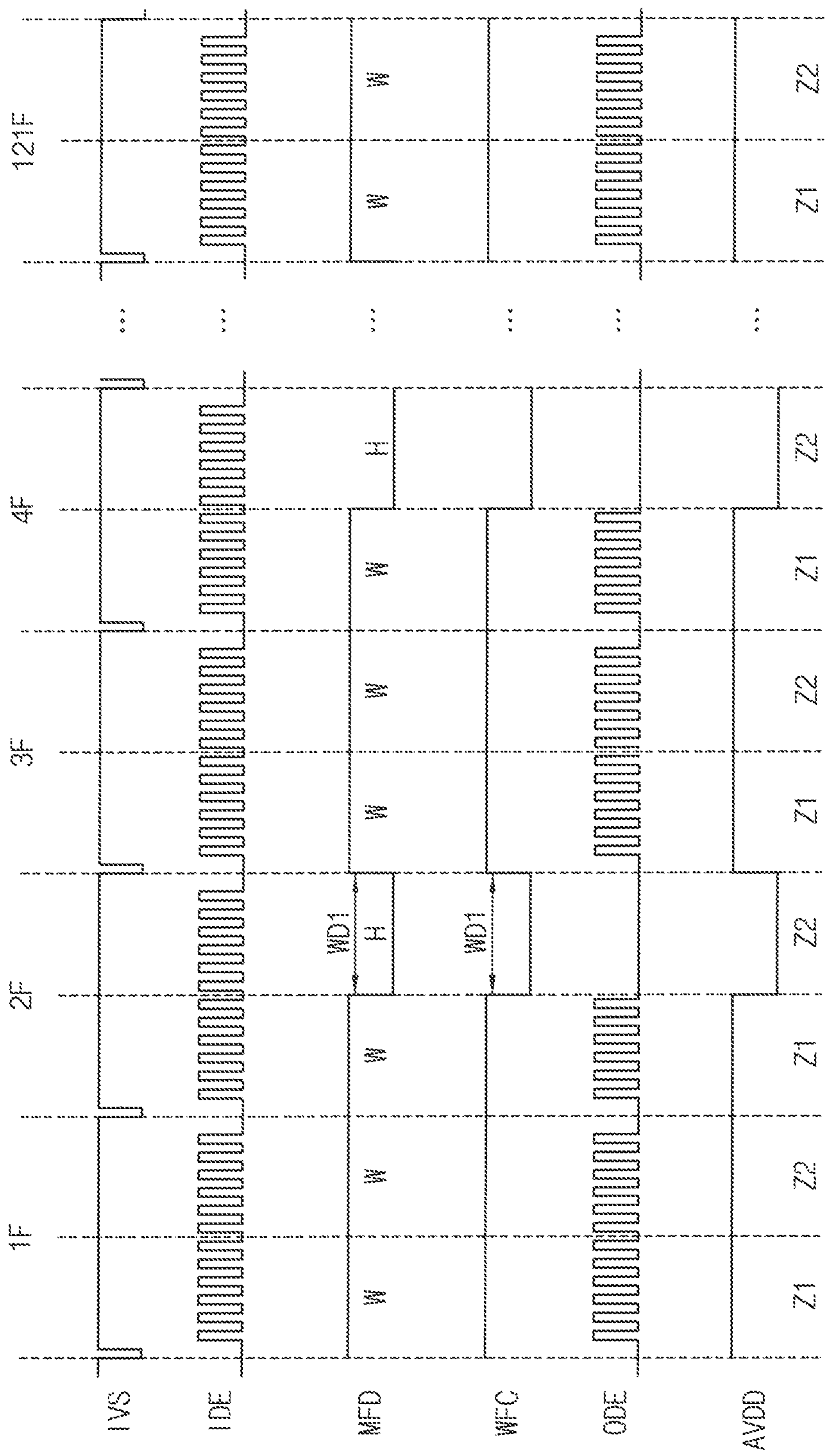
FIG. 8 is a timing diagram illustrating an input signal, a generated signal and an output signal of the driving controller of FIG. 1 and an output signal of the power voltage generator of FIG. 1.

FIG. 8 is a timing diagram illustrating an input signal, a generated signal and an output signal of the driving controller 200 of FIG. 1 and an output signal of the power voltage generator 600 of FIG. 1.

Referring to FIGS. 1 to 8, for example, the driving frequency determiner 230 may determine the driving frequency of the first display area Z1 to 120 Hz and the driving frequency of the second display area Z2 to 60 Hz in FIG. 8.

The first display area Z1 is driven in the frequency of 120 Hz so that the multi frequency signal MFD may have the writing periods W corresponding to the first display area Z1 in first to one hundred and twentieth frames. The second display area Z2 is driven in the frequency of 60 Hz so that the multi frequency signal MFD may have the writing period W corresponding to the second display area Z2 in odd numbered frames, for example, first, third, . . . , and one hundred and nineteenth frames and the holding periods H corresponding to the second display area Z2 in even numbered frames, for example, second, fourth, . . . , and one hundred and twentieth frames.

When the driving frequencies of the display areas Z1 and Z2 are not changed, the waveforms of the signals in the first to one hundred and twentieth frames of FIG. 8 may be repeated in one hundred and twenty first frames to two hundreds and fortieth frames.

The driving frequency determiner 230 may generate a power control signal WFC controlling the data power voltage AVDD to the high power voltage level or the low power voltage level based on the driving frequency of the display area Z1 and Z2. As shown in FIG. 8, the waveform of the power control signal WFC may be substantially the same as the waveform of the multi frequency signal MFD.

FIG. 9 is a table illustrating an example of the flicker value storage 240 of FIG. 2.

Referring to FIGS. 1 to 9, the flicker value storage 240 may store the grayscale values of the input image data IMG and the flicker values for determining the driving frequency of the display panel 100 corresponding to the grayscale values. For example, the flicker value storage 240 may be a lookup table.

In FIG. 9, the input grayscale value of the input image data IMG may be 8 bits, the minimum grayscale value of the input image data IMG may be 0 and the maximum grayscale value of the input image data IMG may be 255. The number of flicker setting stages of the flicker value storage 240 may be 64. When the number of the flicker setting stages increases, the flicker may be effectively removed but a logic size of the driving controller 200 may increase too. Thus, the number of the flicker setting stages may be limited.

Although the input grayscale value has an 8 bits value in FIG. 9, the present inventive concept is not limited thereto.

In FIG. 9, the number of the grayscale values of the input image data IMG is 256 and the number of the flicker setting stages is 64 so that a single flicker value in the flicker value storage 240 may correspond to four grayscale values. For example, a first flicker setting stage stores the flicker value of 0 for the grayscale values of 0 to 3. Herein the flicker value of 0 may represent the driving frequency of 1 Hz. For example, a second flicker setting stage stores the flicker value of 0 for the grayscale values of 4 to 7. Herein the flicker value of 0 may represent the driving frequency of 1 Hz. For example, a third flicker setting stage stores the flicker value of 40 for the grayscale values of 8 to 11. Herein the flicker value of 40 may represent the driving frequency of 2 Hz. For example, a fourth flicker setting stage stores the flicker value of 80 for the grayscale values of 12 to 15. Herein the flicker value of 80 may represent the driving frequency of 5 Hz. For example, a fifth flicker setting stage stores the flicker value of 120 for the grayscale values of 16 to 19. Herein the flicker value of 120 may represent the driving frequency of 10 Hz. For example, a sixth flicker setting stage stores the flicker value of 160 for the grayscale values of 20 to 23. Herein the flicker value of 160 may represent the driving frequency of 30 Hz. For example, a seventh flicker setting stage stores the flicker value of 200 for the grayscale values of 24 to 27. Herein the flicker value of 200 may represent the driving frequency of 60 Hz. For example, a sixty second flicker setting stage stores the flicker value of 0 for the grayscale values of 244 to 247. Herein the flicker value of 0 may represent the driving frequency of 1 Hz. For example, a sixty third flicker setting stage stores the flicker value of 0 for the grayscale values of 248 to 251. Herein the flicker value of 0 may represent the driving frequency of 1 Hz. For example, a sixty fourth flicker setting stage stores the flicker value of 0 for the grayscale values of 252 to 255. Herein the flicker value of 0 may represent the driving frequency of 1 Hz.

According to the present example embodiment, the driving frequency is determined according to an image displayed on the display panel 100 so that a power consumption of the display apparatus may be reduced. In addition, when the input image data IMG include a static image display area and a moving image display area, the static image display area and the moving image display area may be driven in different frequencies so that the power consumption of the display apparatus may be further reduced.

In addition, when the display area has the holding period H corresponding to the low frequency driving mode, the level of the data power voltage AVDD outputted to the data driver 500 during the holding period H may be decreased so that the power consumption of the display apparatus may be reduced.

Figure 10:
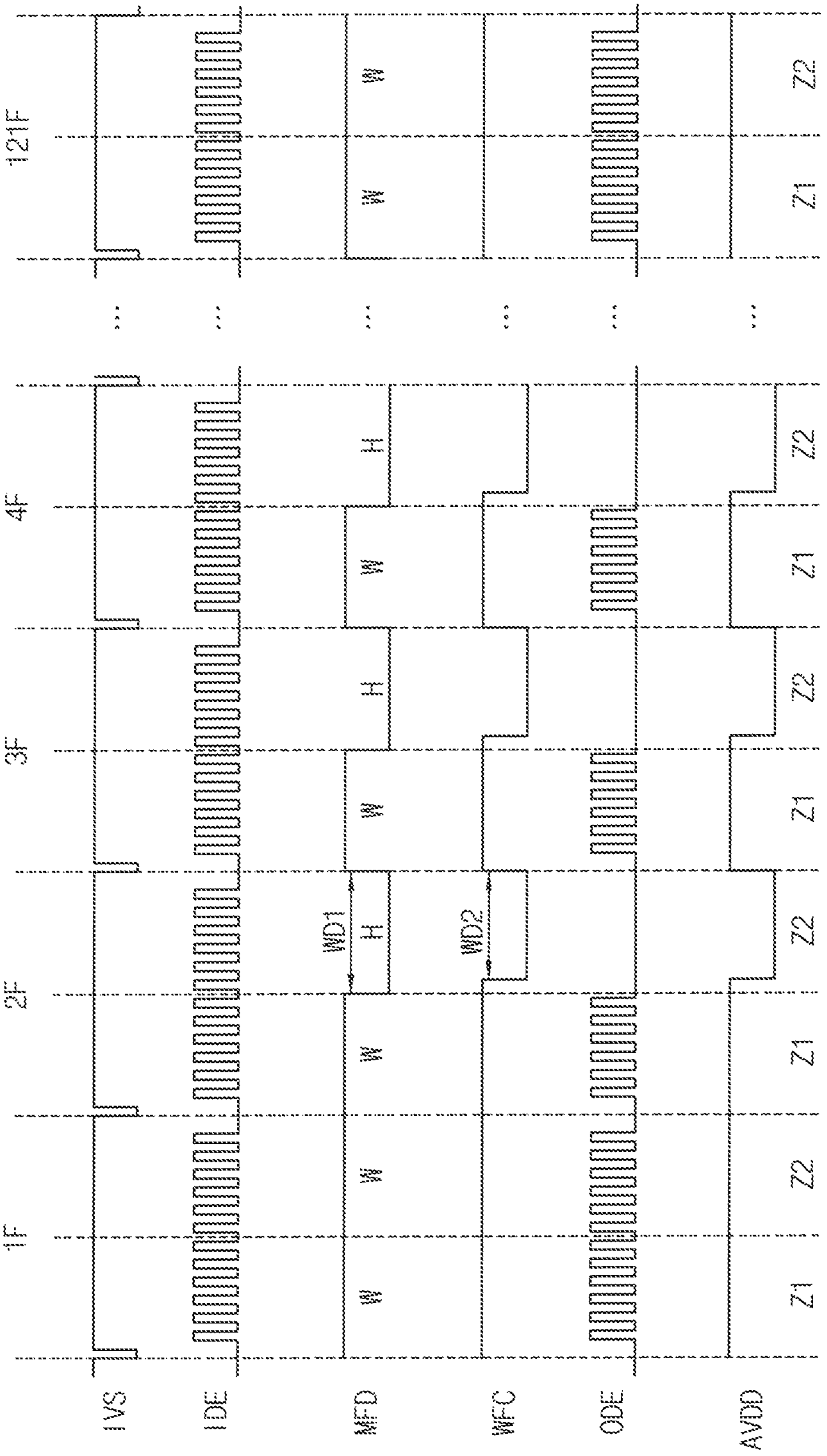
FIG. 10 is a timing diagram illustrating an input signal, a generated signal and an output signal of a driving controller of a display apparatus according to an example embodiment of the present inventive concept and an output signal of a power voltage generator of the display apparatus.

FIG. 10 is a timing diagram illustrating an input signal, a generated signal and an output signal of a driving controller 200 of a display apparatus according to an example embodiment of the present inventive concept and an output signal of a power voltage generator 600 of the display apparatus.

The display apparatus and the method of driving the display panel according to the present example embodiment is substantially the same as the display apparatus and the method of driving the display panel of the previous example embodiment explained referring to FIGS. 1 to 9 except for the waveform of the power control signal and the waveform of the data power voltage. Thus, the same reference numerals will be used to refer to the same or like parts as those described in the previous example embodiment of FIGS. 1 to 9 and any repetitive explanation concerning the above elements will be omitted.

Referring to FIGS. 1 to 6, 9 and 10, the display apparatus includes a display panel 100 and a display panel driver. The display panel driver includes a driving controller 200, a gate driver 300, a gamma reference voltage generator 400 and a data driver 500. The display panel driver may further include a power voltage generator 600.

The driving controller 200 may include a static image determiner 220, a driving frequency determiner 230 and a flicker value storage 240. The driving controller 200 may further include the fixed frequency determiner 210. The driving controller 200 may further include a compensation frame inserter 250.

The display panel 100 may include a plurality of display areas. In the present example embodiment, the display panel 100 may include a first display area Z1 and a second display area Z2.

The driving controller 200 may drive the display areas Z1 and Z2 of the display panel 100 in different driving frequencies. The driving controller 200 may independently determine the driving frequencies of the display areas Z1 and Z2 of the display panel 100.

The driving frequency determiner 230 may generate a multi frequency signal MFD representing whether the display areas Z1 and Z2 have the writing period W or the holding period H in the frame based on the driving frequencies of the display areas Z1 and Z2.

In the present example embodiment, when the second display area Z2 has the holding period H, a data power voltage AVDD applied to the data driver 500 may be turned off so that a power consumption of the data driver 500 may be reduced.

In the present example embodiment, the data power voltage AVDD may have a high power voltage level during the writing period W and have a low power voltage level during the holding period H.

The driving frequency determiner 230 may generate a power control signal WFC controlling the data power voltage AVDD to the high power voltage level or the low power voltage level based on the driving frequency of the display area Z1 and Z2. The power control signal WFC may have a first level for setting the data power voltage AVDD to the high power voltage level and a second level for setting the data power voltage AVDD to the low power voltage level.

In the present example embodiment, a period WD2 when the power control signal WFC has the second level may be shorter than a period WD1 when the multi frequency signal MFD has the inactive level in the holding period H.

For example, a time point when the power control signal WFC is changed from the first level (high level) to the second level (low level) may be later than a time point when the multi frequency signal MFD is changed from the active level to the inactive level in the holding frame H. For example, a time point when the power control signal WFC is changed from the second level to the first level may be same as a time point when the multi frequency signal MFD is changed from the inactive level to the active level in the holding frame H.

The time point when the power control signal WFC turns off the data power voltage AVDD may be set to be later than the time point when the multi frequency signal MFD is changed from the active level to the inactive level so that an unexpected deterioration of the display panel 100 due to turning off of the data power voltage AVDD may be prevented.

According to the present example embodiment, the driving frequency is determined according to an image displayed on the display panel 100 so that a power consumption of the display apparatus may be reduced. In addition, when the input image data IMG include a static image display area and a moving image display area, the static image display area and the moving image display area may be driven in different frequencies so that the power consumption of the display apparatus may be further reduced. For example, the static image display area may be driven in a frequency lower than that of the moving image display area.

In addition, when the display area has the holding period H corresponding to the low frequency driving mode, the level of the data power voltage AVDD outputted to the data driver 500 during the holding period H may be decreased so that the power consumption of the display apparatus may be reduced.

Figure 11:
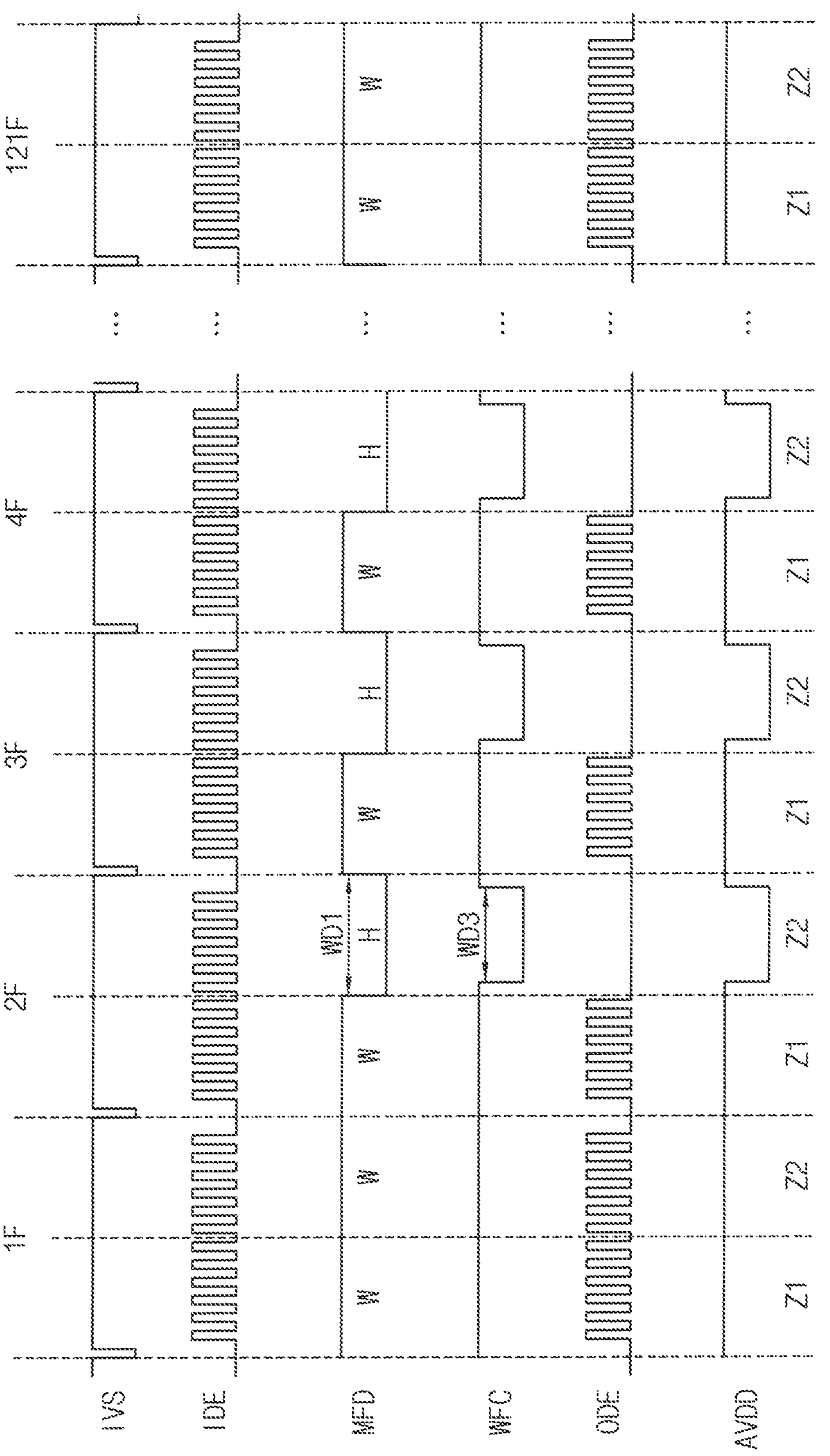
FIG. 11 is a timing diagram illustrating an input signal, a generated signal and an output signal of a driving controller of a display apparatus according to an example embodiment of the present inventive concept and an output signal of a power voltage generator of the display apparatus.

FIG. 11 is a timing diagram illustrating an input signal, a generated signal and an output signal of a driving controller 200 of a display apparatus according to an example embodiment of the present inventive concept and an output signal of a power voltage generator 600 of the display apparatus.

The display apparatus and the method of driving the display panel according to the present example embodiment is substantially the same as the display apparatus and the method of driving the display panel of the previous example embodiment explained referring to FIGS. 1 to 9 except for the waveform of the power control signal and the waveform of the data power voltage. Thus, the same reference numerals will be used to refer to the same or like parts as those described in the previous example embodiment of FIGS. 1 to 9 and any repetitive explanation concerning the above elements will be omitted.

Referring to FIGS. 1 to 6, 9 and 11, the display apparatus includes a display panel 100 and a display panel driver. The display panel driver includes a driving controller 200, a gate driver 300, a gamma reference voltage generator 400 and a data driver 500. The display panel driver may further include a power voltage generator 600.

The driving controller 200 may include a static image determiner 220, a driving frequency determiner 230 and a flicker value storage 240. The driving controller 200 may further include the fixed frequency determiner 210. The driving controller 200 may further include a compensation frame inserter 250.

The display panel 100 may include a plurality of display areas. In the present example embodiment, the display panel 100 may include a first display area Z1 and a second display area Z2.

The driving controller 200 may drive the display areas Z1 and Z2 of the display panel 100 in different driving frequencies. The driving controller 200 may independently determine the driving frequencies of the display areas Z1 and Z2 of the display panel 100.

The driving frequency determiner 230 may generate a multi frequency signal MFD representing whether the display areas Z1 and Z2 have the writing period W or the holding frame H in the frame based on the driving frequencies of the display areas Z1 and Z2.

In the present example embodiment, when the second display area Z2 has the holding period H, a data power voltage AVDD applied to the data driver 500 may be turned off so that a power consumption of the data driver 500 may be reduced.

In the present example embodiment, the data power voltage AVDD may have a high power voltage level during the writing period W and have a low power voltage level during the holding period H.

The driving frequency determiner 230 may generate a power control signal WFC controlling the data power voltage AVDD to the high power voltage level or the low power voltage level based on the driving frequency of the display area Z1 and Z2. The power control signal WFC may have a first level for setting the data power voltage AVDD to the high power voltage level and a second level for setting the data power voltage AVDD to the low power voltage level.

In the present example embodiment, a period WD3 when the power control signal WFC has the second level may be shorter than a period WD1 when the multi frequency signal MFD has the inactive level in the holding period H.

For example, a time point when the power control signal WFC is changed from the first level (high level) to the second level (low level) may be later than a time point when the multi frequency signal MFD is changed from the active level to the inactive level in the holding frame H. For example, a time point when the power control signal WFC is changed from the second level to the first level may be earlier than a time point when the multi frequency signal MFD is changed from the inactive level to the active level in the holding frame H.

The time point when the power control signal WFC turns off the data power voltage AVDD may be set to be later than the time point when the multi frequency signal MFD is changed from the active level to the inactive level and the time when the power control signal WFC turns on the data power voltage AVDD again may be set to be earlier than the time point when the multi frequency signal MFD is changed from the inactive level to the active level again so that an unexpected deterioration of the display panel 100 due to turning off of the data power voltage AVDD or due to turning off of the data power voltage AVDD quickly may be prevented.

According to the present example embodiment, the driving frequency is determined according to an image displayed on the display panel 100 so that a power consumption of the display apparatus may be reduced. In addition, when the input image data IMG include a static image display area and a moving image display area, the static image display area and the moving image display area may be driven in different frequencies so that the power consumption of the display apparatus may be further reduced.

In addition, when the display area has the holding period H corresponding to the low frequency driving mode, the level of the data power voltage AVDD outputted to the data driver 500 during the holding period H may be decreased so that the power consumption of the display apparatus may be reduced.

Figure 12:
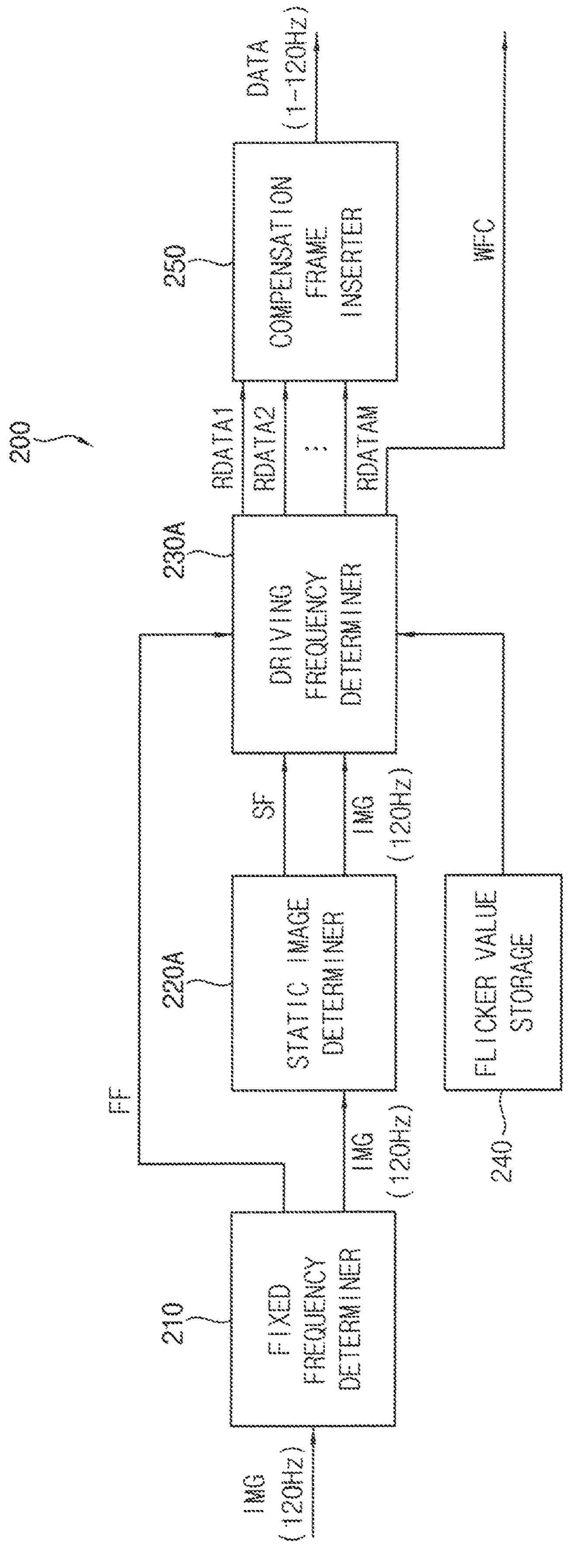
FIG. 12 is a block diagram illustrating a driving controller of a display apparatus according to an example embodiment of the present inventive concept.
Figure 13:
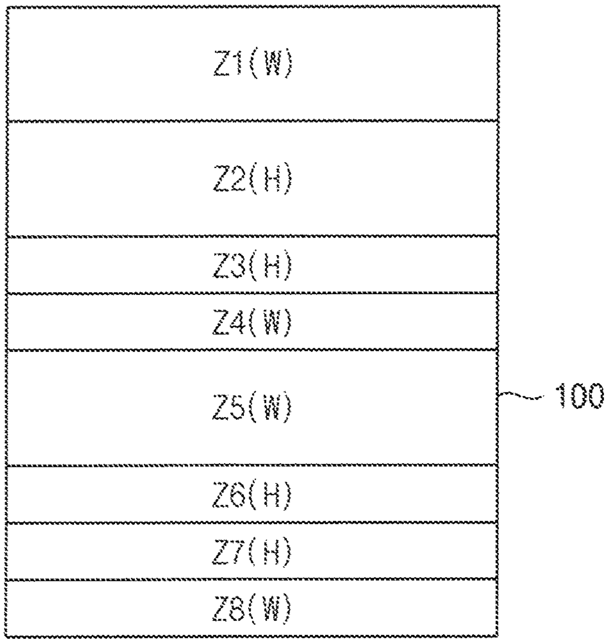
FIG. 13 is a conceptual diagram illustrating a display panel of the display apparatus of FIG. 12 divided into eight display areas.
Figure 14:
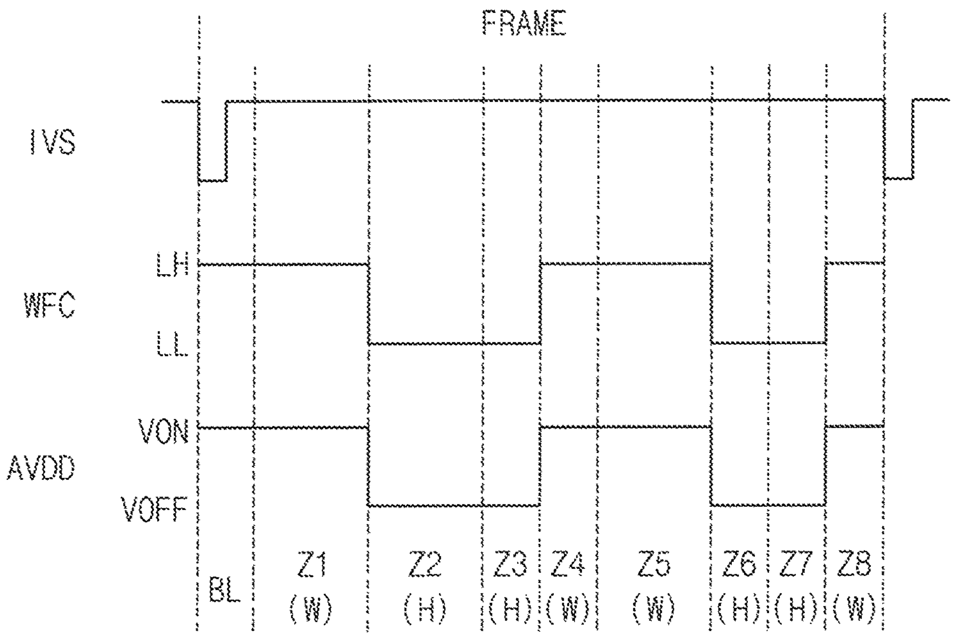
FIG. 14 is a timing diagram illustrating a generated signal of a driving controller of FIG. 12 corresponding to the display areas of FIG. 13 and an output voltage of a power voltage generator of the display apparatus of FIG. 12.

FIG. 12 is a block diagram illustrating a driving controller 200 of a display apparatus according to an example embodiment of the present inventive concept. FIG. 13 is a conceptual diagram illustrating a display panel 100 of the display apparatus of FIG. 12 divided into eight display areas Z1 to Z8. FIG. 14 is a timing diagram illustrating a generated signal of a driving controller 200 of FIG. 12 corresponding to the display areas Z1 to Z8 of FIG. 13 and an output voltage of a power voltage generator 600 of the display apparatus of FIG. 12.

The display apparatus and the method of driving the display panel according to the present example embodiment is substantially the same as the display apparatus and the method of driving the display panel of the previous example embodiment explained referring to FIGS. 1 to 9 except for the number of the display areas and the sizes of the display areas. Thus, the same reference numerals will be used to refer to the same or like parts as those described in the previous example embodiment of FIGS. 1 to 9 and any repetitive explanation concerning the above elements will be omitted.

Referring to FIGS. 1 and 12 to 14, the display apparatus includes a display panel 100 and a display panel driver. The display panel driver includes a driving controller 200, a gate driver 300, a gamma reference voltage generator 400 and a data driver 500. The display panel driver may further include a power voltage generator 600.

The driving controller 200 may include a static image determiner 220A, a driving frequency determiner 230A and a flicker value storage 240. The driving controller 200 may further include the fixed frequency determiner 210. The driving controller 200 may further include a compensation frame inserter 250.

The display panel 100 may include a plurality of display areas. In the present example embodiment, the display panel 100 may include first to eighth display areas Z1 to Z8.

In the present example embodiment, the sizes of some of the first to eighth display areas Z1 to Z8 may be different from one another.

For example, the driving controller 200 may determine sizes of the display areas based on a boundary between a static image display area representing a static image and a moving image display area representing a moving image and a flicker value for the grayscale values of the input image data IMG.

The driving controller 200 may drive the display areas Z1 to Z8 of the display panel 100 in different driving frequencies RDATA1 to RDATAM. The driving controller 200 may independently determine the driving frequencies RDATA1 to RDATAM of the display areas Z1 to Z8 of the display panel 100.

The driving frequency determiner 230A may determine whether the display areas Z1 to Z8 have the writing period W or the holding period H based on the driving frequencies of the display areas Z1 to Z8.

In the present example embodiment, when the display area has the holding period H, a data power voltage AVDD applied to the data driver 500 during the holding period H may be turned off so that a power consumption of the data driver 500 may be reduced.

The driving frequency determiner 230 may generate a power control signal WFC controlling the data power voltage AVDD to the high power voltage level or the low power voltage level based on the driving frequency of the display area Z1 to Z8. The power control signal WFC may have a first level LH for setting the data power voltage AVDD to the high power voltage level VON and a second level LL for setting the data power voltage AVDD to the low power voltage level VOFF.

In FIG. 14, a blank period BL is disposed before the first display area Z1 activation period.

According to the present example embodiment, the driving frequency is determined according to an image displayed on the display panel 100 so that a power consumption of the display apparatus may be reduced. In addition, when the input image data IMG include a static image display area and a moving image display area, the static image display area and the moving image display area may be driven in different frequencies so that the power consumption of the display apparatus may be further reduced.

In addition, when the display area has the holding period H corresponding to the low frequency driving mode, the level of the data power voltage AVDD outputted to the data driver 500 during the holding period H may be decreased so that the power consumption of the display apparatus may be reduced.

Figure 15:
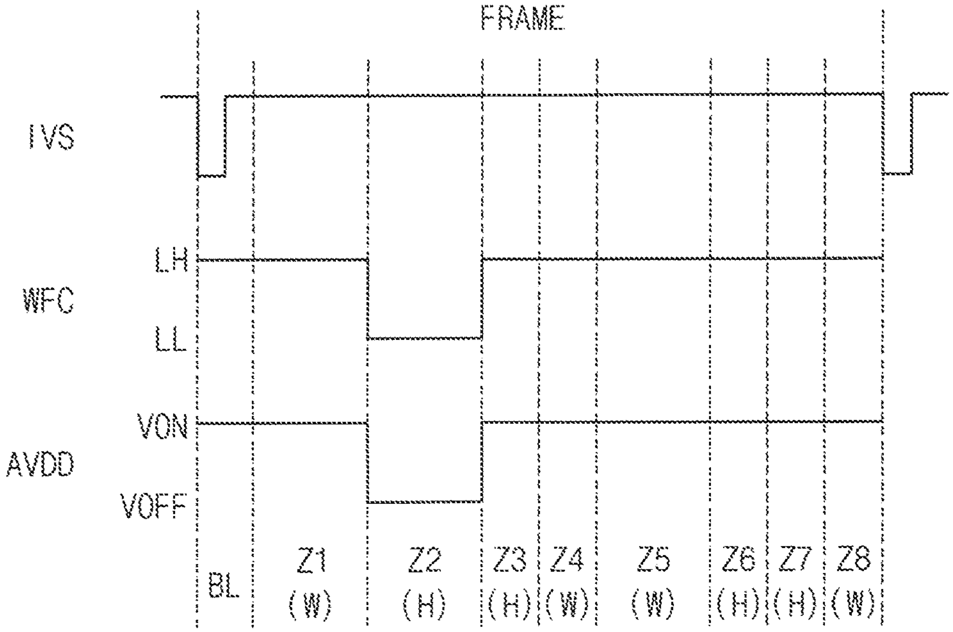
FIG. 15 is a timing diagram illustrating a generated signal of a driving controller of a display apparatus according to an example embodiment of the present inventive concept corresponding to display areas and an output voltage of a power voltage generator of the display apparatus when a display panel includes eight display areas.

FIG. 15 is a timing diagram illustrating a generated signal of a driving controller of a display apparatus according to an example embodiment of the present inventive concept corresponding to display areas and an output voltage of a power voltage generator of the display apparatus when a display panel includes eight display areas.

The display apparatus and the method of driving the display panel according to the present example embodiment is substantially the same as the display apparatus and the method of driving the display panel of the previous example embodiment explained referring to FIGS. 12 to 14 except for the waveform of the power control signal and the waveform of the data power voltage. Thus, the same reference numerals will be used to refer to the same or like parts as those described in the previous example embodiment of FIGS. 12 to 14 and any repetitive explanation concerning the above elements will be omitted.

Referring to FIGS. 1, 12, 13 and 15, the display apparatus includes a display panel 100 and a display panel driver. The display panel driver includes a driving controller 200, a gate driver 300, a gamma reference voltage generator 400 and a data driver 500. The display panel driver may further include a power voltage generator 600.

The driving controller 200 may include a static image determiner 220A, a driving frequency determiner 230A and a flicker value storage 240. The driving controller 200 may further include the fixed frequency determiner 210. The driving controller 200 may further include a compensation frame inserter 250.

The display panel 100 may include a plurality of display areas. In the present example embodiment, the display panel 100 may include first to eighth display areas Z1 to Z8.

In the present example embodiment, the sizes of the first to eighth display areas Z1 to Z8 may be different from one another.

The driving controller 200 may drive the display areas Z1 to Z8 of the display panel 100 in different driving frequencies RDATA1 to RDATAM. The driving controller 200 may independently determine the driving frequencies RDATA1 to RDATAM of the display areas Z1 to Z8 of the display panel 100.

The driving frequency determiner 230A may determine whether the display areas Z1 to Z8 have the writing period W or the holding period H based on the driving frequencies of the display areas Z1 to Z8.

In the present example embodiment, when the display area has the holding period H, a data power voltage AVDD applied to the data driver 500 during the holding period H may be turned off so that a power consumption of the data driver 500 may be reduced.

In the present example embodiment, turning off of the data voltage AVDD may be determined according to the size of the display area Z1 to Z8.

For example, when the size of the display area Z1 to Z8 is equal to or greater than a threshold value and the display area Z1 to Z8 has a holding period H, the data power voltage AVDD may have the low power voltage level VOFF in at least a portion of the holding period H.

In contrast, when the size of the display area Z1 to Z8 is less than the threshold value and the display area Z1 to Z8 has a holding period H, the data power voltage AVDD may have the high power voltage level VON during the holding period H.

For example, in FIG. 15, the sizes of the display areas Z1, Z2 and Z5 may be equal to or greater than the threshold value and the sizes of the display areas Z3, Z4, Z6, Z7 and Z8 may be less than the threshold value.

According to the present example embodiment, the driving frequency is determined according to an image displayed on the display panel 100 so that a power consumption of the display apparatus may be reduced. In addition, when the input image data IMG include a static image display area and a moving image display area, the static image display area and the moving image display area may be driven in different frequencies so that the power consumption of the display apparatus may be further reduced.

In addition, when the display area has the holding period H corresponding to the low frequency driving mode, the level of the data power voltage AVDD outputted to the data driver 500 during the holding period H may be decreased so that the power consumption of the display apparatus may be reduced.

Figure 16:
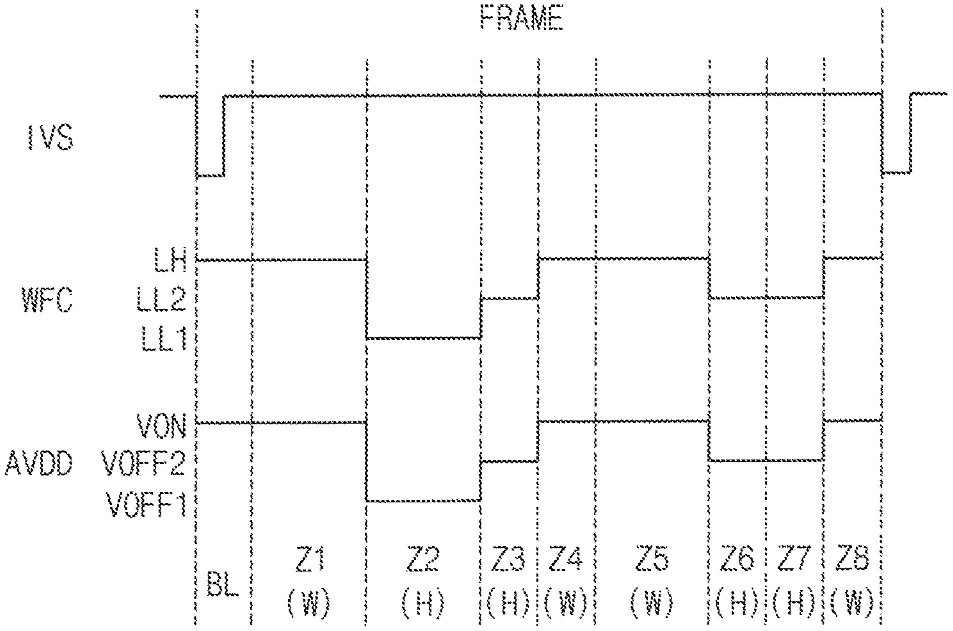
FIG. 16 is a timing diagram illustrating a generated signal of a driving controller of a display apparatus according to an example embodiment of the present inventive concept corresponding to display areas and an output voltage of a power voltage generator of the display apparatus when a display panel includes eight display areas.

FIG. 16 is a timing diagram illustrating a generated signal of a driving controller of a display apparatus according to an example embodiment of the present inventive concept corresponding to display areas and an output voltage of a power voltage generator of the display apparatus when a display panel includes eight display areas.

The display apparatus and the method of driving the display panel according to the present example embodiment is substantially the same as the display apparatus and the method of driving the display panel of the previous example embodiment explained referring to FIGS. 12 to 14 except for the waveform of the power control signal and the waveform of the data power voltage. Thus, the same reference numerals will be used to refer to the same or like parts as those described in the previous example embodiment of FIGS. 12 to 14 and any repetitive explanation concerning the above elements will be omitted.

Referring to FIGS. 1, 12, 13 and 16, the display apparatus includes a display panel 100 and a display panel driver. The display panel driver includes a driving controller 200, a gate driver 300, a gamma reference voltage generator 400 and a data driver 500. The display panel driver may further include a power voltage generator 600.

The driving controller 200 may include a static image determiner 220A, a driving frequency determiner 230A and a flicker value storage 240. The driving controller 200 may further include the fixed frequency determiner 210. The driving controller 200 may further include a compensation frame inserter 250.

The display panel 100 may include a plurality of display areas. In the present example embodiment, the display panel 100 may include first to eighth display areas Z1 to Z8.

In the present example embodiment, the sizes of the first to eighth display areas Z1 to Z8 may be different from one another.

The driving controller 200 may drive the display areas Z1 to Z8 of the display panel 100 in different driving frequencies RDATA1 to RDATAM. The driving controller 200 may independently determine the driving frequencies RDATA1 to RDATAM of the display areas Z1 to Z8 of the display panel 100.

The driving frequency determiner 230A may determine whether the display areas Z1 to Z8 have the writing period W or the holding period H based on the driving frequencies of the display areas Z1 to Z8.

In the present example embodiment, when the display area has the holding period H, a data power voltage AVDD applied to the data driver 500 during the holding period H may be turned off or decreased so that a power consumption of the data driver 500 may be reduced.

In the present example embodiment, turning off of the data voltage AVDD may be determined according to the size of the display area Z1 to Z8.

For example, when the size of the display area Z1 to Z8 is equal to or greater than a threshold value and the display area Z1 to Z8 has a holding period H, the data power voltage AVDD may have a first low power voltage level VOFF1 in at least a portion of the holding period H.

In contrast, when the size of the display area Z1 to Z8 is less than the threshold value and the display area Z1 to Z8 has a holding period H, the data power voltage AVDD may have a second low power voltage level VOFF2 greater than the first low power voltage level VOFF1 and less than the high power voltage level VON during the holding period H.

For example, in FIG. 16, the sizes of the display areas Z1, Z2 and Z5 may be equal to or greater than the threshold value and the sizes of the display areas Z3, Z4, Z6, Z7 and Z8 may be less than the threshold value.

According to the present example embodiment, the driving frequency is determined according to an image displayed on the display panel 100 so that a power consumption of the display apparatus may be reduced. In addition, when the input image data IMG include a static image display area and a moving image display area, the static image display area and the moving image display area may be driven in different frequencies so that the power consumption of the display apparatus may be further reduced.

In addition, when the display area has the holding period H corresponding to the low frequency driving mode, the level of the data power voltage AVDD outputted to the data driver 500 during the holding period H may be decreased so that the power consumption of the display apparatus may be reduced.

Figure 17:
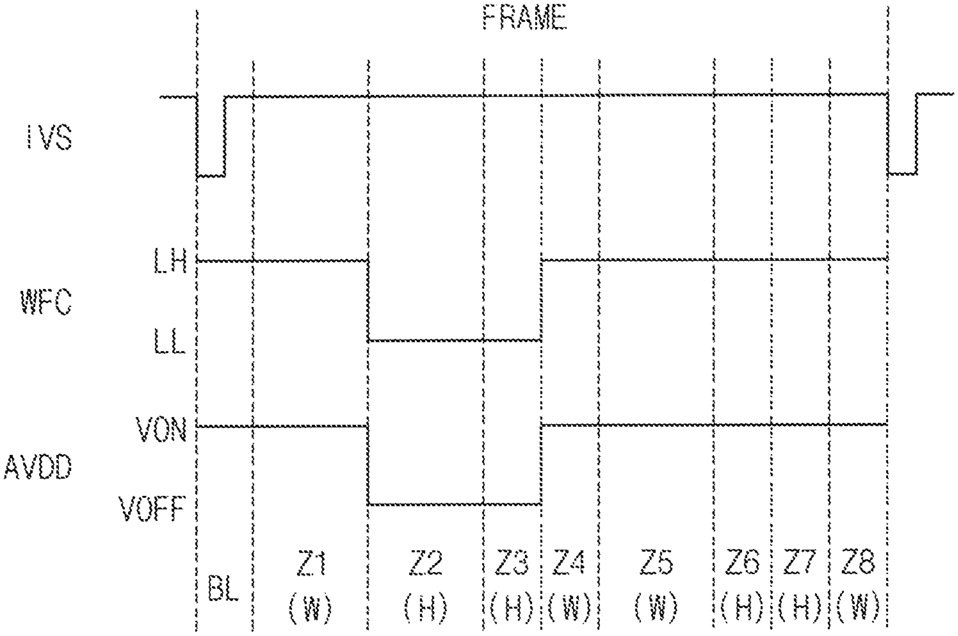
FIG. 17 is a timing diagram illustrating a generated signal of a driving controller of a display apparatus according to an example embodiment of the present inventive concept corresponding to display areas and an output voltage of a power voltage generator of the display apparatus when a display panel includes eight display areas.

FIG. 17 is a timing diagram illustrating a generated signal of a driving controller of a display apparatus according to an example embodiment of the present inventive concept corresponding to display areas and an output voltage of a power voltage generator of the display apparatus when a display panel includes eight display areas.

The display apparatus and the method of driving the display panel according to the present example embodiment is substantially the same as the display apparatus and the method of driving the display panel of the previous example embodiment explained referring to FIGS. 12 to 14 except for the waveform of the power control signal and the waveform of the data power voltage. Thus, the same reference numerals will be used to refer to the same or like parts as those described in the previous example embodiment of FIGS. 12 to 14 and any repetitive explanation concerning the above elements will be omitted.

Referring to FIGS. 1, 12, 13 and 17, the display apparatus includes a display panel 100 and a display panel driver. The display panel driver includes a driving controller 200, a gate driver 300, a gamma reference voltage generator 400 and a data driver 500. The display panel driver may further include a power voltage generator 600.

The driving controller 200 may include a static image determiner 220A, a driving frequency determiner 230A and a flicker value storage 240. The driving controller 200 may further include the fixed frequency determiner 210. The driving controller 200 may further include a compensation frame inserter 250.

The display panel 100 may include a plurality of display areas. In the present example embodiment, the display panel 100 may include first to eighth display areas Z1 to Z8.

In the present example embodiment, the sizes of the first to eighth display areas Z1 to Z8 may be different from one another.

The driving controller 200 may drive the display areas Z1 to Z8 of the display panel 100 in different driving frequencies RDATA1 to RDATAM. The driving controller 200 may independently determine the driving frequencies RDATA1 to RDATAM of the display areas Z1 to Z8 of the display panel 100.

The driving frequency determiner 230A may determine whether the display areas Z1 to Z8 have the writing period W or the holding period H based on the driving frequencies of the display areas Z1 to Z8.

In the present example embodiment, when the display area has the holding period H, a data power voltage AVDD applied to the data driver 500 during the holding period H may be turned off so that a power consumption of the data driver 500 may be reduced.

In the present example embodiment, turn off of the data voltage AVDD may be determined according to the size of the display area Z1 to Z8 and the level of the data power voltage AVDD applied to a previous display area.

For example, when the size of the display area is equal to or greater than a threshold value and the display area has a holding period H, the data power voltage AVDD may have a low power voltage level VOFF in at least a portion of the holding period H of a present display area (e.g., Z2).

In addition, when the size of the display area is less than the threshold value, the display area has the holding period H and the data power voltage AVDD has the low power voltage level VOFF for the previous display area, the data power voltage AVDD may have the low power voltage level VOFF in at least a portion of the holding period H of a present display area (e.g., Z3).

In contrast, when the size of the display area is less than the threshold value, the display area has the holding period H and the data power voltage AVDD have the high power voltage level VON for the previous display area, the data power voltage AVDD may have the high power voltage level VON during the holding period H of a present display area (e.g., Z6 and Z7).

For example, in FIG. 17, the sizes of the display areas Z1, Z2 and Z5 may be equal to or greater than the threshold value and the sizes of the display areas Z3, Z4, Z6, Z7 and Z8 may be less than the threshold value.

According to the present example embodiment, the driving frequency is determined according to an image displayed on the display panel 100 so that a power consumption of the display apparatus may be reduced. In addition, when the input image data IMG include a static image display area and a moving image display area, the static image display area and the moving image display area may be driven in different frequencies so that the power consumption of the display apparatus may be further reduced.

In addition, when the display area has the holding period H corresponding to the low frequency driving mode, the level of the data power voltage AVDD outputted to the data driver 500 during the holding period H may be decreased so that the power consumption of the display apparatus may be reduced.

According to the present inventive concept as explained above, the power consumption of the display apparatus may be reduced.

The foregoing is illustrative of the present inventive concept and is not to be construed as limiting thereof. Although a few example embodiments of the present inventive concept have been described, those skilled in the art will readily appreciate that many modifications are possible in the example embodiments without materially departing from the novel teachings and advantages of the present inventive concept. Accordingly, all such modifications are intended to be included within the scope of the present inventive concept as defined in the claims. In the claims, means-plus-function clauses are intended to cover the structures described herein as performing the recited function and not only structural equivalents but also equivalent structures. Therefore, it is to be understood that the foregoing is illustrative of the present inventive concept and is not to be construed as limited to the specific example embodiments disclosed, and that modifications to the disclosed example embodiments, as well as other example embodiments, are intended to be included within the scope of the appended claims. The present inventive concept is defined by the following claims, with equivalents of the claims to be included therein.

What is claimed is:

1. A display apparatus comprising:

a display panel comprising a gate line, a data line and a pixel, and configure to display an image based on input image data;

a gate driver configured to output a gate signal to the gate line;

a data driver configured to output a data voltage to the data line;

a driving controller configured to drive display areas of the display panel in different driving frequencies;

a power voltage generator configured to output a data power voltage to the data driver; and a gamma reference voltage generator configured to output a gamma reference voltage to the data driver, wherein the display panel includes a first display area displaying a moving image and a second display area displaying a static image, wherein the first display area includes a first pixel circuit including a plurality of transistors, wherein the second display area includes a second pixel circuit including a plurality of transistors, wherein a first driving frequency of the first display area is a frequency of at least one scan signal applied to at least one of the transistors of the first display area, wherein a second driving frequency of the second display area is a frequency of at least one scan signal applied to at least one of the transistors of the second display area, wherein, in a first frame including a first time period and a second time period, at least one of the data power voltage and the gamma reference voltage has a high voltage level in the first time period corresponding to the first display area and in the second time period corresponding to the second display area, wherein, in a second frame subsequent to the first frame and including a third time period and a fourth time period, at least one of the data power voltage and the gamma reference voltage has the high voltage level in the third time period corresponding to the first display area and a low voltage level in at least a portion of the fourth time period corresponding to the second display area, and wherein the driving frequency of the display area increases when a flicker value of the display area increases.

2. The display apparatus of claim 1, wherein the driving controller is configured to output an output data enable signal including a writing period having an active signal and a holding period having an inactive signal for the display areas, respective, and wherein the power voltage generator is configured to generate the data power voltage having the high voltage level during the writing period and the low voltage level in at least a portion of the holding period.

3. The display apparatus of claim 2, wherein the driving controller further comprises a static image determiner determining whether each of the display areas represents a static image or a moving image.

4. The display apparatus of claim 3, wherein the driving controller comprises a driving frequency determiner determines driving frequencies of the display areas based on flicker values according to grayscale values of the input image data corresponding to the display areas.

5. The display apparatus of claim 4, wherein the driving controller is configured to determine whether each of the display areas is in the writing period or the holding period in a frame based on the driving frequencies of the display areas, and wherein the driving controller is configured to generate a multi frequency signal having an active level during the writing period and an inactive level during the holding period.

6. The display apparatus of claim 5, wherein the driving controller is configured to generate a power control signal having a first level during the writing period and a second level in the at least a portion of the holding period.

7. The display apparatus of claim 6, wherein, when a first group of the display areas has the writing period and a second group of the display areas has the holding period in the frame, the multi frequency signal has the active level when the power control signal has the first level and the multi frequency signal has the inactive level when the power control signal has the second level.

8. The display apparatus of claim 6, wherein, when the display area is in the holding period, a period when the power control signal has the second level is shorter than a period when the multi frequency signal has the inactive level.

9. The display apparatus of claim 8, wherein, when the display area is in the holding period, a time point when the power control signal is changed from the first level to the second level is later than a time point when the multi frequency signal is changed from the active level to the inactive level, and wherein, when the display area is in the holding period, a time point when the power control signal is changed from the second level to the first level is same as a time point when the multi frequency signal is changed from the inactive level to the active level in the holding period.

10. The display apparatus of claim 8, wherein, when the display area is in the holding period, a time point when the power control signal is changed from the first level to the second level is later than a time point when the multi frequency signal is changed from the active level to the inactive level in the holding period, and wherein, when the display area has the holding period, a time point when the power control signal is changed from the second level to the first level is earlier than a time point when the multi frequency signal is changed from the inactive level to the active level in the holding period.

11. The display apparatus of claim 4, wherein the driving controller further comprises a fixed frequency determiner determining whether an input frequency of the input image data has a normal type by counting a number of pulses of a vertical synchronizing signal in one second.

12. The display apparatus of claim 4, wherein the driving controller further comprises a compensation frame inserter inserting a compensation frame between a frame of a first frequency and a frame of a second frequency when the driving frequency of the display area is changed from the first frequency to the second frequency by the driving frequency determiner.

13. A method of driving a display panel, the method comprising:

independently determining driving frequencies of display areas by a driving controller;

generating a data power voltage;

generating a gamma reference voltage; and outputting a data voltage to a data line of the display panel using input image data, wherein the display panel includes a first display area representing a moving image and a second display area representing a static image, wherein the first display area includes a first pixel circuit including a plurality of transistors, wherein the second display area includes a second pixel circuit including a plurality of transistors, wherein a first driving frequency of the first display area is a frequency of at least one scan signal applied to at least one of the transistors of the first display area, wherein a second driving frequency of the second display area is a frequency of at least one scan signal applied to at least one of the transistors of the second display area, wherein, in a first frame including a first time period and a second time period, at least one of the data power voltage and the gamma reference voltage has a high voltage level in the first time period corresponding to the first display area and in the second time period corresponding to the second display area, wherein, in a second frame subsequent to the first frame and including a third time period and a fourth time period, at least one of the data power voltage and the gamma reference voltage has the high voltage level in the third time period corresponding to the first display area and a low voltage level in at least a portion of the fourth time period corresponding to the second display area, and wherein the driving frequency of the display area increases when a flicker value of the display area increases.

* * * * *